(12) United States Patent
Teraue

(10) Patent No.: US 7,589,864 B2
(45) Date of Patent: Sep. 15, 2009

(54) COLOR CONVERSION APPARATUS AND COLOR CONVERSION PROGRAM STORAGE MEDIUM

(75) Inventor: Eiji Teraue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 648 days.

(21) Appl. No.: 11/088,918

(22) Filed: Mar. 25, 2005

(65) Prior Publication Data

US 2005/0212907 A1 Sep. 29, 2005

(30) Foreign Application Priority Data

Mar. 26, 2004 (JP) ............... 2004-092074

(51) Int. Cl.
*G06F 15/00* (2006.01)
*G06K 1/00* (2006.01)
*G06K 9/00* (2006.01)
*G03F 3/08* (2006.01)

(52) U.S. Cl. ............... 358/1.9; 358/518; 382/162; 382/167

(58) Field of Classification Search ............... 358/1.1, 358/1.9, 500, 504, 518; 382/162, 167
See application file for complete search history.

(56) References Cited

U.S. PATENT DOCUMENTS

| | | | | |
|---|---|---|---|---|
| 5,835,624 A | * | 11/1998 | Ueda et al. | ............... 382/162 |
| 7,075,678 B2 | * | 7/2006 | Ohkubo | ............... 358/1.9 |
| 2003/0184777 A1 | * | 10/2003 | Ikeno | ............... 358/1.9 |
| 2003/0234943 A1 | * | 12/2003 | Van Bael | ............... 358/1.9 |
| 2004/0032602 A1 | * | 2/2004 | Teraue | ............... 358/1.9 |

FOREIGN PATENT DOCUMENTS

| | | |
|---|---|---|
| JP | 10248017 A | 9/1998 |
| JP | 2001-157074 A | 6/2001 |
| JP | 2004-80186 A | 3/2004 |
| JP | 2004074498 A | 3/2004 |

* cited by examiner

*Primary Examiner*—Mark K Zimmerman
*Assistant Examiner*—Ming Hon
(74) *Attorney, Agent, or Firm*—Sughrue Mion, PLLC

(57) ABSTRACT

The present invention provides a color conversion apparatus that converts image data for a printing press into image data for a printer. The apparatus includes: a first spot color conversion processing section that converts a spot color name into a L*a*b* value by referring to a L*a*b* separation spot color table in which spot colors are associated with L*a*b* values and converts the obtained L*a*b* value into process colors of ink colors for a printer by referring a printer profile; and a second spot color conversion processing section that converts a spot color name into ink color data for the printer by referring to an N-color separation table in which spot color names are associated with ink colors for the printer. The apparatus uses either one of these sections by switching from one to the other, or uses both the sections according to priority.

28 Claims, 20 Drawing Sheets

Fig. 9

| Spot color name | L*a*b* |
|---|---|
| SP1 | 40  30  40 |
| SP2 | 10  30  40 |
| SP3 | 20  10  30 |
| SP4 | 50  30  20 |

Fig. 10

| Spot color name | $C_2$ $M_2$ $Y_2$ $K_2$ O G |
|---|---|
| SP1 | 20 10  0  0 30 10 |
| SP2 | (Undefined) |
| SP3 | 50 20  0  0  0 30 |
| SP4 | (Undefined) |

Fig. 11

| Spot color name | Ink color name |
|---|---|
| SP1 | Orange(O) |
| SP2 | Green(G) |
| SP3 | (Undefined) |
| SP4 | (Undefined) |

Fig. 12

| Simulation method | SW | Priority |
|---|---|---|
| First simulation method | OFF | — |
| Second simulation method | ON | 2 |
| Third simulation method | ON | 1 |

| Simulation method | SW | Priority |
|---|---|---|
| First simulation method | ON | 2 |
| Second simulation method | OFF | — |
| Third simulation method | ON | 1 |

Fig. 18

| Simulation method | SW | Priority |
|---|---|---|
| First Simulation method | ON | 2 |
| Second simulation method | ON | 1 |
| Third simulation method | OFF | — |

Fig. 20

| Simulation method | SW | Priority |
|---|---|---|
| First Simulation method | ON | 3 |
| Second simulation method | ON | 2 |
| Third simulation method | ON | 1 |

Fig. 22

COLOR CONVERSION APPARATUS AND COLOR CONVERSION PROGRAM STORAGE MEDIUM

BACKGROUND OF THE INVENTION

1. Field of the Invention

The present invention relates to a color conversion apparatus which is applied to a system using a printer to print out a proof image representing colors of a color printed sheet before color printing is performed on a color printing press using a spot color in addition to process colors to convert image data for printing into image data for the printer, and to a color conversion program storage medium on which a color conversion program is stored which causes an information processing device such as a computer to function as the color conversion apparatus.

2. Description of the Related Art

Before printing a color image on a color printing press, a printer is used to print out a proof image having colors which look as much like those of the final image to be printed on the printing press as possible. In order to create such a proof image, a printing profile which describes the relation between image data and colors of an actual printed sheet and matches conditions such as the type of the printing press on which printing is performed and the conditions under which the printing press is used (the conditions required for a specific kind of printing, including the type of ink used, the quality of paper, and the type of the printing press, are herein called printing conditions) and a printer profile which describes the type of the printer on which a proof image is printed out and the conditions under which the printer is used (the conditions required for printing out a particular proof image, including the type of the printer, are herein called print conditions) should be known, image data for printing should be converted into image data for the printer according to the printing profile and the printer profile, and the proof image based on the converted printer image data should be printed out. In this way, the proof image having colors identical to the colors that will appear on the actual printed sheet can be provided. Usually, a printing profile that matches typical printing conditions is available from a printing company, and a printer profile is provided by the manufacturer of a printer designed for printing out proof images.

In order to convert image data for printing into image data for printer to output a proof image, typically a printing profile and a printer profile are combined into a link profile in LUT (Look-Up Table) form, the LUT is referred to, and interpolating operations are performed for lower bits for which no correspondences are described in the LUT.

The printing is typically performed by using process inks of four colors, CMYK (cyan, magenta, yellow, and black). In addition to the four process color inks, spot color inks can be used. In that case, it is not realistic to provide printing profiles for all possible combinations of the CMYK process inks and many spot color inks. Usually, printing profiles that suit printing in the CMYK process inks are provided. Therefore, the LUT created as described above is used for converting process color image data defined in a color space of the four colors CMYK for printing in the CMYK process inks into image data defined in a color space of CMYK for outputting a print image in color materials of CMYK, for example. For the sake of distinction, herein the CMYK for printing are referred to as $C_1 M_1 Y_1 K_1$ and the CMYK for printer are referred to as $C_2 M_2 Y_2 K_2$.

When printing in spot color inks in addition to the $C_1 M_1 Y_1 K_1$ process inks in these circumstances, the problem is how to output a proof image for a printed sheet.

In this regard, Japanese Patent Laid-Open No. 2001-157074 proposes an approach. In the proposed approach, process color image data for printing ($C_1 M_1 Y_1 K_1$ data) is converted into process color image data for printer ($C_2 M_2 Y_2 K_2$ data or RGB data) with reference to a link profile as described above. For spot colors, a correspondence table describing the correspondence between the spot color names and the properties (such as the coordinates (L*a*b* values) in an L*a*b* color space) of the spot color ink with the spot color names, which are available from the manufacturer of the spot color inks, is created. The spot color name of a spot color ink used for printing is converted into L*a*b* values and then the L*a*b* values are converted into printer process color image data with reference to a printer profile. This process color image data is data corresponding to the spot color ink's solid color with a dot density of 100% (color with the maximum density). In addition to the process color image data corresponding to the solid color of the spot color, tone data (dot density % data) of the spot color used for the printing is also inputted. From these items of data, process color image data corresponding to the tone data of the spot color is obtained. Furthermore, the printer process color image data converted from the printing process color image data is combined with the spot color process color image data thus obtained to obtain image data to be inputted into the printer. With approach described in Japanese Patent Laid-Open No. 2001-157074, a fairly universal color conversion system can be readily built simply by obtaining properties (L*a*b* values) recommended by the manufacturer of spot color inks, in addition to a printing profile and a printer profile (and a link profile which is the combination of the two profiles).

The approach proposed in Japanese Patent Laid-Open No. 2001-157074 is simple, universal, and fairly good. However, there may be occasions where the appearance of the portion of an image printed out by a color conversion system built using the approach proposed in Japanese Patent Laid-Open No. 2001-157074 that corresponds to a spot color for printing is unsatisfactory and therefore fine adjustment of the color of the spot color on the printed image is desirable. This is because the appearance of the printing spot color on the printed image is slightly different from the predicted one due to various error factors: an error may be introduced when the spot color is converted into data with a given density because the properties (L*a*b* values) of the printing spot color obtained from the manufacturer of the spot color ink corresponds to a full density of 100%, or the printer profile may be imperfect and include an error, or an error may be introduced by interpolating operations which are necessary because the profiles typically are LUTs.

The approach proposed in Japanese Patent Laid-Open No. 2001-157074 provides a color conversion system which has a table that associates spot color names with L*a*b* values. When adjusting the color of the portion of a printed image that corresponds to a spot color for printing, the L*a*b* values associated with the spot color name are rewritten.

However, it is difficult to intuitively know which of the values of L*, a*, and b* should be rewritten to what extent in order to achieve almost the same color as a desired one. Accordingly, it is difficult to make adjustments.

Printers are available on which spot color inks can be used in addition to process inks. With the approach proposed in Japanese Patent Laid-Open No. 2001-157074, however, spot colors cannot be represented with spot color inks in combination with process color inks. Furthermore, the approach proposed in Japanese Patent Laid-Open No. 2001-157074 cannot separate a spot color of a binary printing image into other colors.

SUMMARY OF THE INVENTION

The present invention has been made in view of the above circumstances and provides a color conversion apparatus that can be used with various types of printers in converting data for printing into data for printer and allows for adjusting the color on a print image that corresponds to a spot color for printing, and a color conversion program storage medium which stores a color conversion program that causes an information processing device such as a computer to function as such a color conversion apparatus.

According to the present invention, there is provided a color conversion apparatus which converts image data for printing which includes process color tone data for printing and spot color tone data for printing into image data for printer which includes tone data for a printer, the color conversion apparatus including: a process color processing section which has a link profile in which process colors for printing are associated with colors for the printer and converts process color tone data in the image data for printing into the tone data for the printer according to the link profile; a first spot color processing section which has a first spot color name conversion table in which the spot color names of spot colors for printing are associated with the coordinates in a given common color space that correspond to the maximum densities of the spot colors and a printer profile in which the common color space is associated with colors for the printer, and first converts the spot color name of a spot color in the image data for printing into coordinates in the common color space with reference to the first spot color name conversion table and then converts the coordinates in the common color space obtained from the conversion into tone data for the printer that corresponds to the maximum density of the spot color with reference to the printer profile; a second spot color processing section which has a second spot color name conversion table in which the spot color names of spot colors for printing are associated with colors for the printer that correspond to the maximum densities of the spot colors, and converts the spot color name of a spot color in the image data for printing into tone data for the printer that corresponds to the maximum density of the spot color with reference to the second spot color name conversion table; a spot color processing determining section which determines whether each of the first and second spot color processing sections should be applied or not; and a color combining section which combines tone data for the printer obtained by the process color processing section with the tone data of a spot color in the image data for printing, in accordance with the tone data for the printer that corresponds to the maximum density of a spot color for printing obtained by the first spot color conversion section when the first spot color conversion section is applied and tone data for the printer that corresponds to the maximum density of a spot color for printing obtained by the second spot color conversion section when the second spot color conversion section is applied, and thereby generates the image data for the printer.

Preferably, the spot color processing determining section determines whether each of the first and second spot color processing sections should be applied or not and determines the priorities in application of the first and second spot color processing sections if both of the first and second spot color processing sections are applied.

The color conversion apparatus of the present invention includes both of the first and second spot color processing sections.

The first spot color processing section employs the approach proposed in Japanese Patent Laid-Open No. 2001-157074 and has the first spot color name conversion table in which spot color names are associated with coordinates (for example L*a*b* values) in a common color space (for example in an L*a*b* color space). As described above, the first spot color name conversion table can be readily created simply by entering properties (L*a*b* values) of spot colors for printing, which are available from a source such an ink manufacturer. However, the first spot color name conversion table does not facilitate intuitive adjustment of a color on a print image that corresponds to a spot color for printing. On the other hand, the second spot color processing section has the second spot color name conversion table in which spot color names are directly associated with colors for printer. The second spot color name conversion table cannot be created by simply entering properties (L*a*b* values) of spot colors for printing obtained from an ink manufacturer. Instead, the second spot color name conversion table must be created in such a manner that the spot color names are converted into desired tone data for printer, and accordingly takes a lot of labor. However, once created, the second spot color name conversion table enables a color on a print image that corresponds to a specific spot color for printing to be readily adjusted in a desired direction by rewriting a color value for printer contained in the second spot color name conversion table, which can be intuitively associated with the color on the print image.

In addition, if the printer used allows spot color inks to be used in combination with process color inks, color values for printer including the colors of the spot color inks can be entered in the second spot color conversion table so that adjustment of colors including the colors of the spot color inks can be made.

The color conversion apparatus of the present invention has the first and second spot color processing sections with different characteristics as described above, and the spot color processing determining section determines which of the two spot color processing sections is to be used. Alternatively, the spot color processing determining section may allow both of the first and second spot color processing sections to be used and may determine their priorities in such a case.

With the configuration as described above, the color conversion apparatus of the present invention is suitable for various types of printers and also suitable for various situations such as those where determination is made as to whether a color on a print image that corresponds to a spot color for printing should be adjusted.

Preferably, the color conversion apparatus of the present invention further includes a third spot color processing section which has a third spot color name conversion table in which the spot color names of spot colors for printing are associated with specific color names for the printer, and converts the spot color name of a spot color in the image data for printing into a specific color name for the printer that corresponds to the spot color name with reference to the third spot color name conversion table, wherein the spot color processing determining section determines whether each of the first and second spot color processing sections should be applied or not and also determines whether the third spot color processing section should be applied or not, and wherein the color combining section combines tone data for the printer obtained by the process color processing section and tone data of a spot color in the image data for printing, in accordance with a specific color name for the printer that corresponds to a spot color name for printing obtained by the third spot color conversion section when the third spot color conversion section is applied, in addition to tone data for the printer that corresponds to the maximum density of the spot color for printing obtained by the first spot color conversion section when the first spot color conversion section is applied and tone data for the printer that corresponds to the maximum density of a spot color for printing obtained by the second spot color conversion section when the second color conversion section is applied, and thereby generates the image data for the printer.

In this case, the spot color processing determining section preferably determines whether each of the first, second, and third spot color processing sections should be applied or not and, if two or more of the first, second, and third spot color processing sections are applied, determines their priorities in application.

If a printer capable of using spot color inks as well is used, the properties of a spot color ink being used for printing may match those of the spot color inks that can be used on the printer with a sufficient accuracy.

The third spot color processing section is effective in such a case, where a spot color for printing can be directly replaced with a spot color that can be used on the printer.

Furthermore, according to the present invention, there is provided a color conversion program storage medium on which a color conversion program is stored, the color conversion program being executed within an information processing device on which a program is executed and causing the information processing device to function as a color conversion apparatus which converts image data for printing which includes process color tone data for printing and spot color tone data for printing into image data for printer which includes tone data for a printer, in which the color conversion program stored on the color conversion program storage medium causes the information processing device to function as a color processing device including: a process color processing section which has a link profile in which process colors for printing are associated with colors for the printer and converts process color tone data in the image data for printing into the tone data for the printer according to the link profile; a first spot color processing section which has a first spot color name conversion table in which the spot color names of spot colors for printing are associated with the coordinates in a given common color space that correspond to the maximum densities of the spot colors and a printer profile in which the common color space is associated with colors for the printer, and first converts the spot color name of a spot color in the image data for printing into coordinates in the common color space with reference to the first spot color name conversion table and then converts the coordinates in the common color space obtained from the conversion into tone data for the printer that corresponds to the maximum density of the spot color with reference to the printer profile; a second spot color processing section which has a second spot color name conversion table in which the spot color names of spot colors for printing are associated with colors for the printer that correspond to the maximum densities of the spot colors, and converts the spot color name of a spot color in the image data for printing into tone data for the printer that corresponds to the maximum density of the spot color with reference to the second spot color name conversion table; a spot color processing determining section which determines whether each of the first and second spot color processing sections should be applied or not; and a color combining section which combines tone data for the printer obtained by the process color processing section with the tone data of a spot color in the image data for printing, in accordance with tone data for the printer that corresponds to the maximum density of a spot color for printing obtained by the first spot color conversion section when the first spot color conversion section is applied and tone data for the printer that corresponds to the maximum density of a spot color for printing obtained by the second spot color conversion section when the second spot color conversion section is applied, and thereby generates the image data for the printer.

Preferably, the spot color processing determining section determines whether each of the first and second spot color processing sections should be applied or not, and determines the priorities in application of the first and second spot color processing sections if both of the first and second spot color processing sections are applied.

Moreover, in the color conversion program storage medium of the present invention, preferably the color conversion program stored thereon causes the information processing device to function as the color conversion apparatus further comprising a third spot color processing section, and the third spot color processing section has a third spot color name conversion table in which the spot color names of spot colors for printing are associated with specific color names for the printer and converts the spot color name of a spot color in the image data for printing into a specific color name for the printer that corresponds to the spot color name with reference to the third spot color name conversion table, wherein the spot color processing determining section determines whether each of the first and second spot color processing sections should be applied or not and also determines whether the third spot color processing section should be applied or not, and wherein the color combining section combines tone data for the printer obtained by the process color processing section and tone data of a spot color in the image data for printing, in accordance with a specific color name for the printer that corresponds to a spot color name for printing obtained by the third spot color conversion section when the third spot color conversion section is applied, in addition to tone data for the printer that corresponds to the maximum density of the spot color for printing obtained by the first spot color conversion section when the first spot color conversion section is applied and tone data for the printer that corresponds to the maximum density of a spot color for printing obtained by the second spot color conversion section when the second color conversion section is applied and thereby generates the image data for the printer.

In this case, the spot color processing determining section preferably determines whether each of the first, second, and third spot color processing sections should be applied or not and, if two or more of the first, second, and third spot color processing sections are applied, determines the priorities in application of the two or more spot color processing sections.

The present invention as has been described above enables color conversion suitable for various types of printers and allows for adjustment of a color on a print image that corresponds to a spot color, when converting the image data for printing including the spot color into the image data for printer.

BRIEF DESCRIPTION OF THE DRAWINGS

Preferred embodiments of the present invention will be described in detail based on the following figures, wherein:

FIG. 9 shows an example of an L*a*b* separation spot color table;

FIG. 10 shows an example of N-color separation table;

FIG. 11 shows an example of a name replacing table;

FIG. 12 shows an exemplary simulation method determining table;

FIG. 18 shows another exemplary simulation method determining table;

FIG. 20 shows another example of the simulation method determining table;

FIG. 22 shows a yet another exemplary simulation method determining table;

DETAILED DESCRIPTION OF THE PREFERRED EMBODIMENTS

Embodiments of the present invention will be described below.

Figure 1:
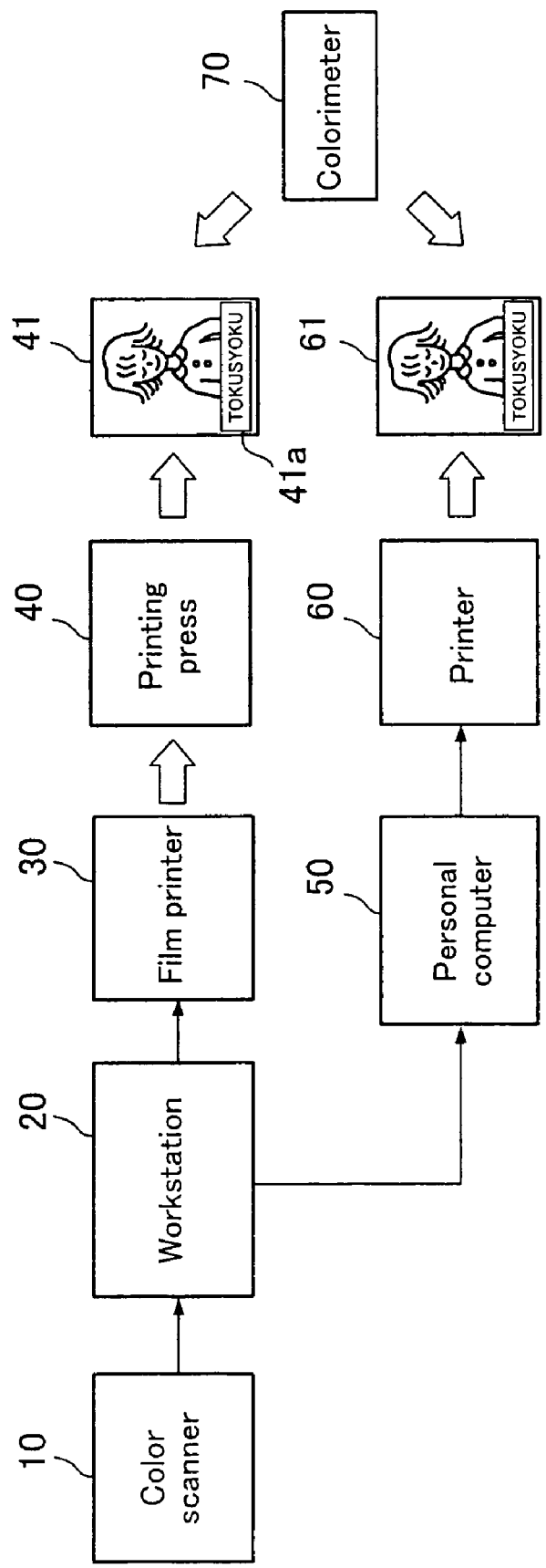
FIG. 1 is a general view of a printing and proof image generating system according to one embodiment of the present invention.

FIG. 1 is a general view of a printing and proof image generating system according to one embodiment of the present invention.

A color scanner 10 reads an original image to generate a color separation image data in four colors, CMYK (cyan, magenta, yellow, and black), that represents the read image. This CMYK image data is inputted into a workstation 20, where electronic assembling based on the inputted data is performed by an operator to generate image data representing an image to be printed. Here, the operator operating the workstation 20 decides to perform printing in a spot color ink in addition to the CMYK process color inks. In the electronic assembling, an image including the spot color is designed. Therefore, tone data of the process colors which are defined as coordinates in a CMYK color space and tone data of the spot color to be used are generated as image data for printing which represents the image to be printed. This printing image data consisting of the process color tone data and the spot color tone data is inputted into a film printer 30 when printing is performed. In the film printer 30, original printing film plates consisting of CMYK plates and a spot color plate that correspond to the inputted printing image data are created. For the sake of later distinction, CMYK for printing are denoted as $C_1M_1Y_1K_1$.

Press plates are created from the original printing film plates and the created press plates are loaded into a printing press 40. Inks are applied to the press plates loaded into the printing press and the inks are transferred to a printing paper sheet to create an image 41 on the sheet. The inks used here are process inks of four colors, $C_1M_1Y_1K_1$, and a given spot color ink. On the image 41, there is a portion 41a printed in the spot color ink.

The process in which original film plates are created on the film printer 30, press plates are created and loaded into the printing press 4, inks are applied to the press plates, and then images are printed on paper sheets are extensive and costly. Therefore, before performing actual printing, a proof image 61 is generated on a printer as described below so that the appearance of the final printed image 41 can be previewed.

In order to generate a proof image, printing image data generated by electronic assembling on the workstation 20 is inputted into a personal computer 50. The image data inputted in the personal computer 50 is description language data written in a PDL (Page Description Language), which is converted into tone data of four process colors CMYK and tone data of the spot color, which are developed by a RIP (Raster Image Processor) into a bitmap in the personal computer 50. The image data, which is the combination of the CMYK-process-color tone data and the spot color tone data, is practically the same as the printing image data inputted into the film printer 30.

The process-color tone data and the spot color tone data are converted in the personal computer 50 into CMYK image data compatible with a printer 60. The CMYK image data is inputted into the printer 60, where a proof image 61 is generated based on the inputted CMYK image data.

The printer 60 may be a printer that uses spot color inks in addition to the CMYK inks, which will be described later. For simplicity of the description, it is assumed here that the printer 60 prints out the proof image 61 in the CMYK process inks.

The degree of agreement between the colors of the image 41 provided by printing on the printing press 40 and the colors of the proof image provided on the printer 60 is determined by color conversion within the personal computer 50. The calorimeter 70 shown in FIG. 1 will be described later.

The appearance of the final printed image can be checked beforehand by generating and previewing the proof image in this way.

A feature of the proof image generating system shown in FIG. 1 as one embodiment of the present invention is processing performed within the personal computer 50. The personal computer 50 will be described below.

Figure 2:
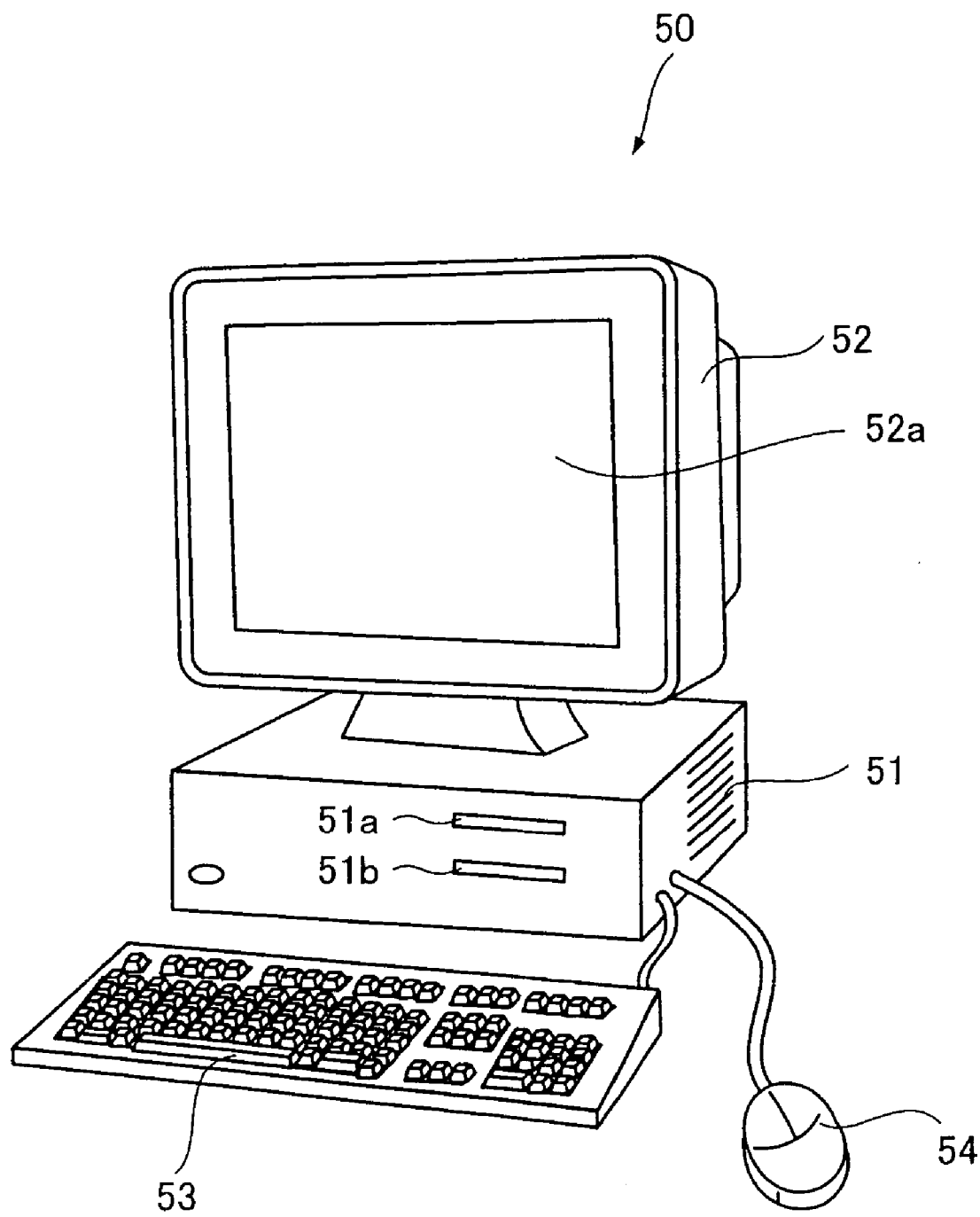
FIG. 2 is an external perspective view of a personal computer.
Figure 3:
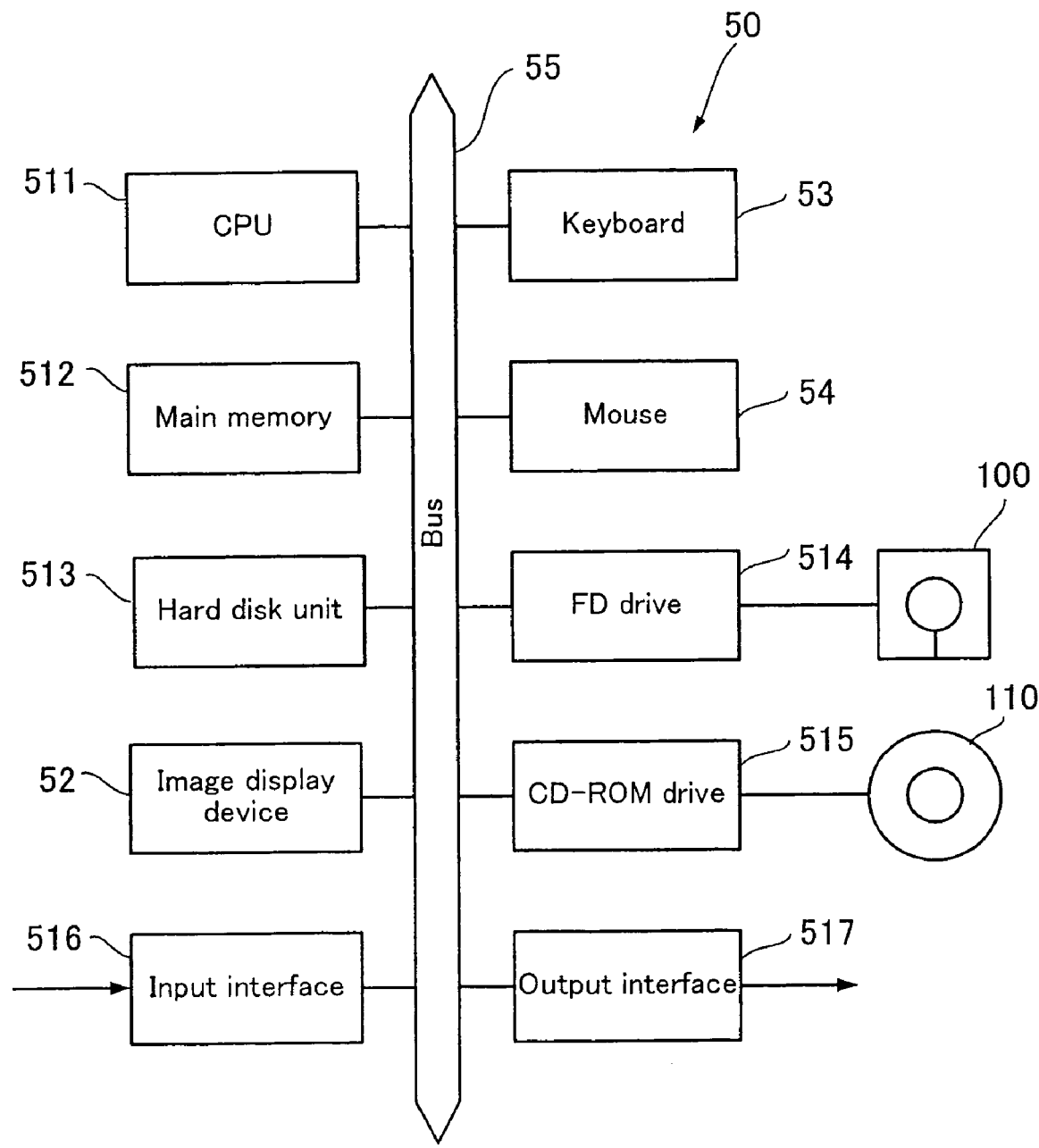
FIG. 3 shows a hardware configuration of the personal computer.

FIG. 2 shows an external perspective view of the personal computer 50 shown in a block in FIG. 1, and FIG. 3 shows a hardware configuration of the personal computer 50.

The personal computer 50 includes, as components visible from the outside, a system unit 51, an image display device 52 on which an image is displayed on a display screen 52a in response to an instruction from the system unit 51, a keyboard 53 through which various kinds of information are inputted into the system unit 51 by keying operations, and a mouse 54 with which a position on the display screen 52a is pointed to and an instruction, which depends on an item such as an icon displayed at the position, is inputted. The system unit 51 has, as components visible from the outside, an FD slot 51a for loading a flexible disk (FD) and a CD-ROM slot 51b for loading a CD-ROM.

Provided inside the system unit 51 are a CPU 511, which executes programs, a main memory 512 on which a program stored in and read from a hard disk unit 513 is loaded for execution by the CPU 511, the hard disk unit 513, a flexible disk drive 514, which accesses a flexible disk 100 loaded in it, a CD-ROM drive 515 which accesses a CD-ROM 110 loaded in it, an input interface 516, which is connected to the workstation 20 (see FIG. 1) and receives image data from the workstation 20, and an output interface 517 which sends image data to the printer 60 used as a proofer. These components and the image display device 52, keyboard 53, and mouse 54 are interconnected through a bus 55 shown in FIG. 2.

The CD-ROM 110, which contains a color conversion program for causing the personal computer 50 to function as a color conversion apparatus, is loaded into the CD-ROM drive 515. The color conversion program stored on the CD-ROM 110 is installed in the personal computer 50 and stored in the hard disk unit 513.

Figure 4:
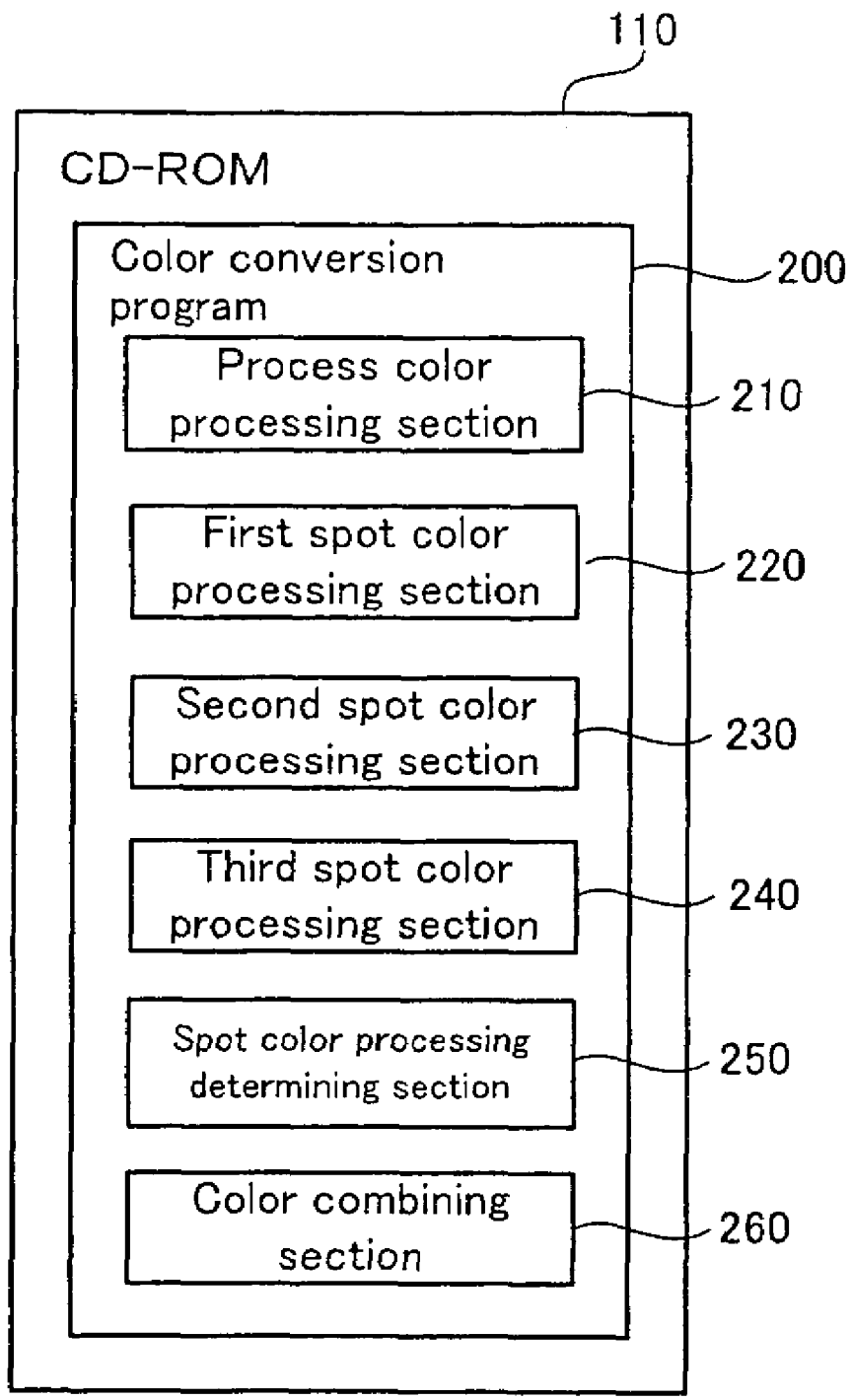
FIG. 4 schematically shows a configuration of a color conversion program stored on a color conversion program storage medium according to one embodiment of the present invention.

FIG. 4 schematically shows a configuration of a color conversion program stored on a CD-ROM, which is one embodiment of a color conversion program storage medium of the present invention.

Stored on the CD-ROM 110 is the color conversion program 200 including a process color processing section 210, a first spot color processing section 220, a second spot color processing section 230, a third spot color processing section 240, a spot color processing determining section 250, and a color combining section 260. The functions of the sections 210 to 260 constituting the color conversion program 200 will be described later.

Figure 5:
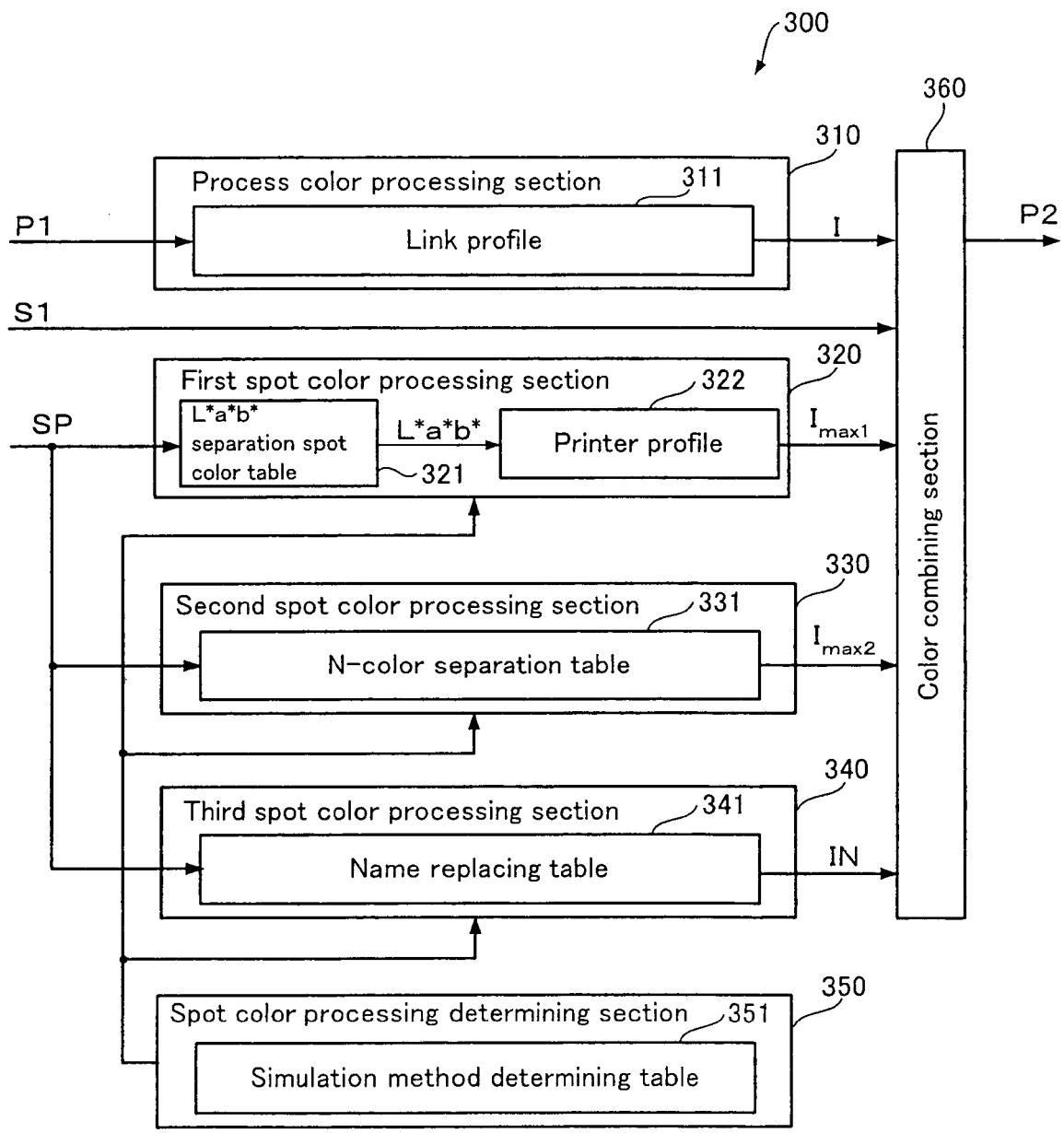
FIG. 5 is a functional block diagram of a color conversion apparatus according to one embodiment of the present invention.

FIG. 5 is a functional block diagram of a color conversion apparatus according to one embodiment of the present invention.

The color conversion apparatus 300 shown in FIG. 5 represents functions implemented by the personal computer 50 when the color conversion program 200 shown in FIG. 4 is installed in the personal computer 50 shown in FIGS. 1 to 3 and executed on the personal computer 50.

The color conversion apparatus 300 shown in FIG. 5, which converts image data for printing into tone data for printer 60 (see FIG. 1), includes a process color processing section 310, a first spot color processing section 320, a second spot color processing section 330, a third spot color processing section 340, a spot color processing determining section 350, and a color combining section 360. These components 310 to 360 are implemented within the personal computer 50 by the corresponding sections 210 to 260 of the color conversion program 200 when the color conversion program 200 is installed and executed in the personal computer 50. The sections 310 to 360 of the color conversion apparatus 300 will be described below, which will also serve as the description of the sections 210 to 260 of the color conversion program 200 shown in FIG. 4.

Inputted into the color conversion apparatus 300 are $C_1M_1Y_1K_1$-process-color tone data P1 for printing, spot color tone data S1 for printing, and the spot color name SP of the spot color.

It is assumed here that the printer 60 shown in FIG. 1 is capable of outputting a print image using spot color inks of orange (O) and green (G) in addition to the four process colors, C, M, Y, and K. For distinction from $C_1M_1Y_1K_1$ for printing, the CMYK for printer 60 are denoted as $C_2M_2Y_2K_2$.

The process-color tone data P1 for printing is inputted into the process color processing section 310 and converted into tone data I of process color inks (of the four colors $C_2M_2Y_2K_2$) used on the printer 60 (see FIG. 1) with reference to a link profile 311. The link profile 311 is an LUT (Look-Up table) which associates the process colors for printing ($C_1M_1Y_1K_1$) with the process colors for printer ($C_2M_2Y_2K_2$). The link profile 311 will be described later.

The spot color tone data S1 for printing is directly inputted into the color combining section 360.

The name of a spot color for printing (spot color name) SP is inputted into the first spot color processing section 320, second spot color processing section 330, and third spot color processing section 340.

The spot color name SP inputted into the first spot color processing section 320 is converted into L*a*b* values with reference to an L*a*b* separation spot color table 321. The L*a*b* values are then converted into tone data $I_{max1}$ of the process colors ($C_2M_2Y_2K_2$) for printing with reference to a printer profile 322. The L*a*b* separation spot color table 321 is a table that associates the name of spot colors for printing with the coordinates (L*a*b* values) corresponding to the maximum density (dot density=100%) of the spot color in an L*a*b* color space. The L*a*b* values, which can be obtained by referring to the L*a*b* separation spot color table 321, correspond to the maximum density (dot density=100%) of the spot color with that spot color name SP.

The printer profile 322 is an LUT which associates the L*a*b* color space and the process colors for printing ($C_2M_2Y_2K_2$). Because the L*a*b* values that can be obtained by referring to the L*a*b* separation spot color table 321 correspond to the maximum density (dot density=100%) of the spot color, the tone data $I_{max1}$ of the process colors for printer ($C_2M_2Y_2K_2$) which can be obtained from the L*a*b* values with reference to the printer profile 322, also corresponds to the maximum density (dot density=100%) of the spot color. The L*a*b* separation spot color table 321 and the printer profile 322 will be described later.

In the second spot color processing section 330, the spot color name SP is directly converted into tone data $I_{max2}$ of ink colors ($C_2M_2Y_2K_2OG$) by referring to an N-color separation table 331. The N-color separation table 331 associates the names of spot colors for printing and ink colors for the printer ($C_2M_2Y_2K_2OG$) that correspond to the maximum densities of the spot colors. Accordingly, the tone data $I_{max2}$ of ink colors for the printer ($C_2M_2Y_2K_2OG$) that can be obtained by referring to the N-color separation table 331 is data corresponding to the maximum density (dot density=100%) of the spot color. The N-color separation table 331 will be described later.

In the third spot color processing section 340, the inputted spot color name SP of the spot color for printing is converted into the ink color name of a spot color IN for the printer 60 (in this example it is converted into O (orange) or G (green)) by referring to a name replacing table 341. The name replacing table 341 is a table that associates the name of spot colors for printing with the ink color name of the spot colors for the printer 60. The name replacing table 341 will be detailed later.

In the spot color processing determining section 350, a simulation method determining table 351 is defined. The simulation method determining table 351 defines which of the first to third spot color processing sections 320, 330, and 340 should be used and, if two or more spot color processing sections are to be used, also defines the priorities in use of them. The spot color processing determining section 350 refers to the simulation method determining table 351 to determine the spot color processing sections to use and their priorities, and indicates them to the spot color processing sections 330, 340, and 350.

The color combining section 360 combines the tone data I of the process colors for the printer ($C_2M_2Y_2K_2$) outputted from the process color processing section 310 with the tone data S1 of the spot color for printing. For the combining, an output (the tone data $I_{max1}$, tone data $I_{max2}$, or the ink name of the spot color for printer IN) from any of the first to third spot color processing sections 320, 330, and 340 that are determined by the spot color processing determining section 350 are referred to. If the priorities of the spot color processing sections are determined, they are used according to the priorities.

The output (the tone data $I_{max1}$, the tone data $I_{max2}$, or the ink name IN of the spot color for printer) from the spot color processing section(s) determined by the spot color processing determining section 350 is referred to for adjusting the tone data S1 of the spot color. The color combining section 360 makes adjustments of the tone data S1 of the spot color. Then, the adjusted tone data of the spot color is combined with the tone data I of the process colors. The method for adjusting the spot color tone data will be described later. If there are the two types of tone data for each of the ink colors $C_2$, $M_2$, $Y_2$, $K_2$, O, and G, they are added together during the combination. For example, if the process-color tone data of $C_2$ is of a dot density of 30% and the tone data of the spot color is of a dot density of 15%, these tone data of $C_2$ are combined together into the tone data: a dot density=30%+15%=45%.

In this way, the tone data of each of $C_2$, $M_2$, $Y_2$, $K_2$, O, and G are combined to generate printer image data P2 in the color combining section 360.

The printer image data P2 is sent to the printer 60 shown in FIG. 1 and a proof image 61 is generated from the printer image data P2.

Figure 6:
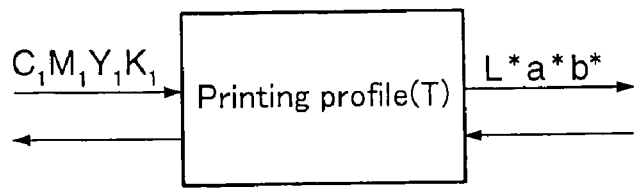
FIG. 6 is a conceptual diagram of a printing profile.

FIG. 6 shows a conceptual diagram of a printing profile.

As mentioned previously, the printing profile that suits typical printing conditions is usually available from a printing company. While it is unnecessary to create a printing profile if the printing profile that suits desired printing conditions is obtained, a basic method for newly creating a printing profile will be described below.

On the workstation shown in FIG. 1, the dot density data of the four colors $C_1M_1Y_1K_1$ is changed gradually from 0% to 10%, . . . , to 100%, for example, and a color-patch image is generated based on the dot density % data by following the printing process described above. While the image 41 shown in FIG. 1 is not a color-patch image, the assumption here is that a color-patch image is printed instead of the image 41. The color of each color-patch is measured with the calorimeter 70 and thereby a printing profile that indicates the correspondences between the coordinates of the four colors $C_1M_1Y_1K_1$ and their coordinates in the L*a*b* color space is built.

Here, the color-patches for building the printing profile are generated by using only the four colors $C_1M_1Y_1$, $K_1$ without using a spot color ink. This is because, if a spot color ink were added, a printing profile without universality would be built. Also, it would be burdensome to establish a printing profile for each of various spot color inks and combinations thereof.

Figure 7:
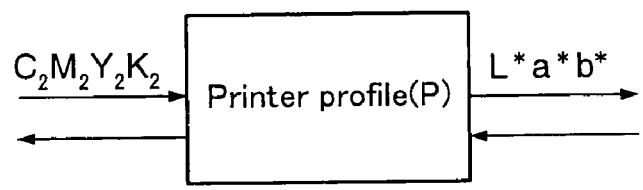
FIG. 7 is a conceptual diagram of a printer profile.

FIG. 7 shows a conceptual diagram of a printer profile.

As mentioned earlier, printer profiles are typically available from printer manufacturers. If a printer profile that suits a desired printer (in this example, the printer 60 shown in FIG. 1) can be obtained, it is unnecessary to build a printer profile.

A basic method for newly building a printer profile will be described below. The method for building a printer profile is similar to the method for building a printing profile described above.

On the personal computer 50 shown in FIG. 1, the image data of each of the four colors $C_2M_2Y_2K_2$ is incremented from the minimum value (for example 0) to the maximum value (for example 100) and a color-patch image is generated based on the thus sequentially generated image data. While the image 61 shown in FIG. 1 is not a color-patch image, it is assumed here that the color-patch image is generated instead of the image 61. The color of each of the color-patches constituting the color-patch image is measured with the colorimeter 70 and thereby a printer profile for the printer 60 that indicates the correspondences between the coordinates of the four colors $C_2M_2Y_2K_2$ in the color space and their coordinates in the L*a*b* color space is created.

The printer profile 322 referred to by the first spot color processing section 320 in FIG. 5 is generated in this way.

Figure 8:
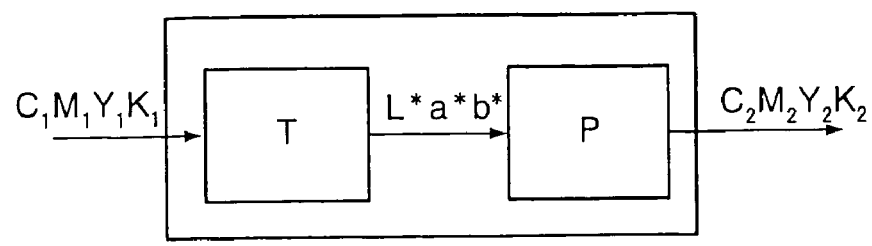
FIG. 8 is a conceptual diagram of a link profile which is generated by combining a printing profile and a printer profile and used for directly converting coordinates in a $C_1M_1Y_1K_1$ color space into coordinates in a $C_2M_2Y_2K_2$ color space.

FIG. 8 shows a conceptual diagram of a link profile, which is built by combining a printing profile with a printer profile and is used for directly converting the coordinates in the $C_1M_1Y_1K_1$ color space into the coordinates in the $C_2M_2Y_2K_2$ color space.

Here, the printing profile and the printer profile are combined into a link profile used for directly converting the coordinates in the $C_1M_1Y_1K_1$ color space into the coordinates in $C_2M_2Y_2K_2$ color space without using the L*a*b* color space.

The link profile 311 referred to by the process color processing section 310 in FIG. 5 is built in this way.

FIG. 9 shows an example of an L*a*b* separation spot color table.

Shown in FIG. 9 are spot color names SP1 to SP4 of spot colors for printing and the L*a*b* values associated with the spot color names SP1 to SP4. The L*a*b* values shown with the spot color names SP1 to SP4 are the L*a*b* values of the spot color inks with those spot color names when the dot density=100%.

As mentioned earlier, information on the L*a*b* values corresponding to each spot color name is available from the manufacturer of the spot color ink. Alternatively, a patch solidly filled with the color of the spot color ink may be printed out and the L*a*b* values may be measured with a calorimeter. The L*a*b* separation spot color table can be readily completed simply by entering spot color names obtained and their L*a*b* values in it. However, if the L*a*b* values in the table are changed, it is difficult to intuitively predict how the change of the L*a*b* values affects the color of the final image printed out on the printer 60. The L*a*b* separation spot color table is the L*a*b* separation spot color table 321 referred to by the first spot color processing section 320 in FIG. 5 and is an example of a first spot color name conversion table of the present invention.

FIG. 10 shows an example of an N-color separation table.

The N-color separation table is an example of a second spot color name conversion table of the present invention, which is referred to as the N-color separation table 331 by the second spot color processing section 330 in FIG. 5.

The printer 60 shown in FIG. 1 is capable of printing out an image 61 in spot color inks of orange (O) and green (G) in addition to process color inks ($C_2M_2Y_2K_2$). The term "N-color" of the N-color separation table herein means six colors, $C_2$, $M_2$, $Y_2$, $K_2$, O, and G. In the N-color separation table shown in FIG. 10, the values of $C_2M_2Y_2K_2OG$ for only spot color names SP1 and SP3 are defined (for SP1, ($C_2M_2Y_2K_2OG$)=(20 10 0 0 30 10) and for SP3, ($C_2M_2Y_2K_2OG$=(50 20 0 0 0 30)). The values of ($C_2M_2Y_2K_2OG$) in the N-color separation table in FIG. 10 are determined so that the L*a*b* values obtained for SP1, for example, by inputting patch data having the values $C_2$=20, $M_2$=10, Y=0, K=0, O=30, and G=10 into the printer 60 shown in FIG. 1, printing out a color patch, and measuring the color of the generated patch with a calorimeter becomes equal to the L*a*b* values of the spot color name SP1 obtained from the manufacturer, that is, the L*a*b* values obtained by measuring the color of the patch printed in the spot color ink with the spot color name SP1, with a full density of 100%.

The creation of the N-color separation table involves determining the values of $C_2M_2Y_2K_2OG$ by trial and error in this way and accordingly requires much labor than the creation of a L*a*b* separation spot color table in FIG. 9. However, once the table has been created, colors on the final image printed out on the printer 60 can be adjusted simply by adjusting the $C_2M_2Y_2K_2OG$ values in the table. The $C_2M_2Y_2K_2OG$ values are dependent on the printer 60 and one can intuitively connects the direction in which he/she wants to adjust a color on an image to be printed out with the direction in which he/she is adjusting the values of $C_2M_2Y_2K_2OG$.

Since the printer 60 is capable of using six color inks $C_2M_2Y_2K_2OG$, the N-color separation table shown in FIG. 10 is defined so that the spot color names for printing is separated into six colors $C_2M_2Y_2K_2OG$. For a printer that uses only the process inks $C_2M_2Y_2K_2$, a table that separates colors into the four colors $C_2M_2Y_2K_2$ is used instead of the N-color separation table in FIG. 10. For a printer that accepts the tone data of the three colors, R (red), G (green), and B (blue), a table that separates the spot color names into the three colors RGB is used. However, a printer that uses spot colors in addition to process colors, like the printer 60 described herein, may also use a table that separates the spot color names for printing into only the process colors ($C_2M_2Y_2K_2$).

FIG. 11 shows an example of a name replacing table.

The name replacing table is the name replacing table 341 referred to by the third spot color processing section 340 in FIG. 5 and is an example of a third spot color name conversion table according to the present invention.

The name replacing table indicates the correlations between the names of spot color inks for printing (spot color names) and the names of the spot color inks (orange (O) and green (G) in this example) that can be used on the printer 60. In FIG. 11, the printing spot color name SP1 is associated with the ink name O used on the printer 60 and the printing spot color name SP2 is associated with the ink name G used on the printer 60. The printing spot color names SP3 and SP4 are associated with no ink names.

It should be noted that the examples given here are intended to provide a conceptual illustration. For example, while the spot color name SP1 is associated with (L*, a*, b*)=(40, 30, 40) in the L*a*b* separation spot color table in FIG. 9, with ($C_2M_2Y_2K_2OG$)=(20, 10, 0, 0, 30, 10) in the N-color separation table in FIG. 10, and with orange (O) in the name replacing table in FIG. 11, these values are given for convenience of description and do not necessarily represent the same chromaticities in objective terms.

FIG. 12 shows an example of a simulation method determining table referred to by the spot color processing determining section 350 in FIG. 5.

In the present embodiment, three simulation methods are available: a first simulation method, which is a spot color processing algorithm used in the first spot color processing section 320 in FIG. 5, a second simulation method, which is a spot color processing algorithm used in the second spot color processing section 330 in FIG. 5, and a third simulation method, which is a spot color processing algorithm used in the third spot color processing section 340 in FIG. 5. Accordingly, a simulation method determining table as shown in FIG. 12 as an example is provided. An operator specifies in this table whether each of the simulation methods is to be used or not (the SW column) and, if two or more simulation methods are to be used, their priorities in use.

In the example shown in FIG. 12, it is defined that the first simulation method is not to be used (SW=OFF) and both of the second and third simulation methods are to be used (SW=ON), and that the priority of the third simulation method is given first priority and the second simulation method is given second priority.

Figure 13:
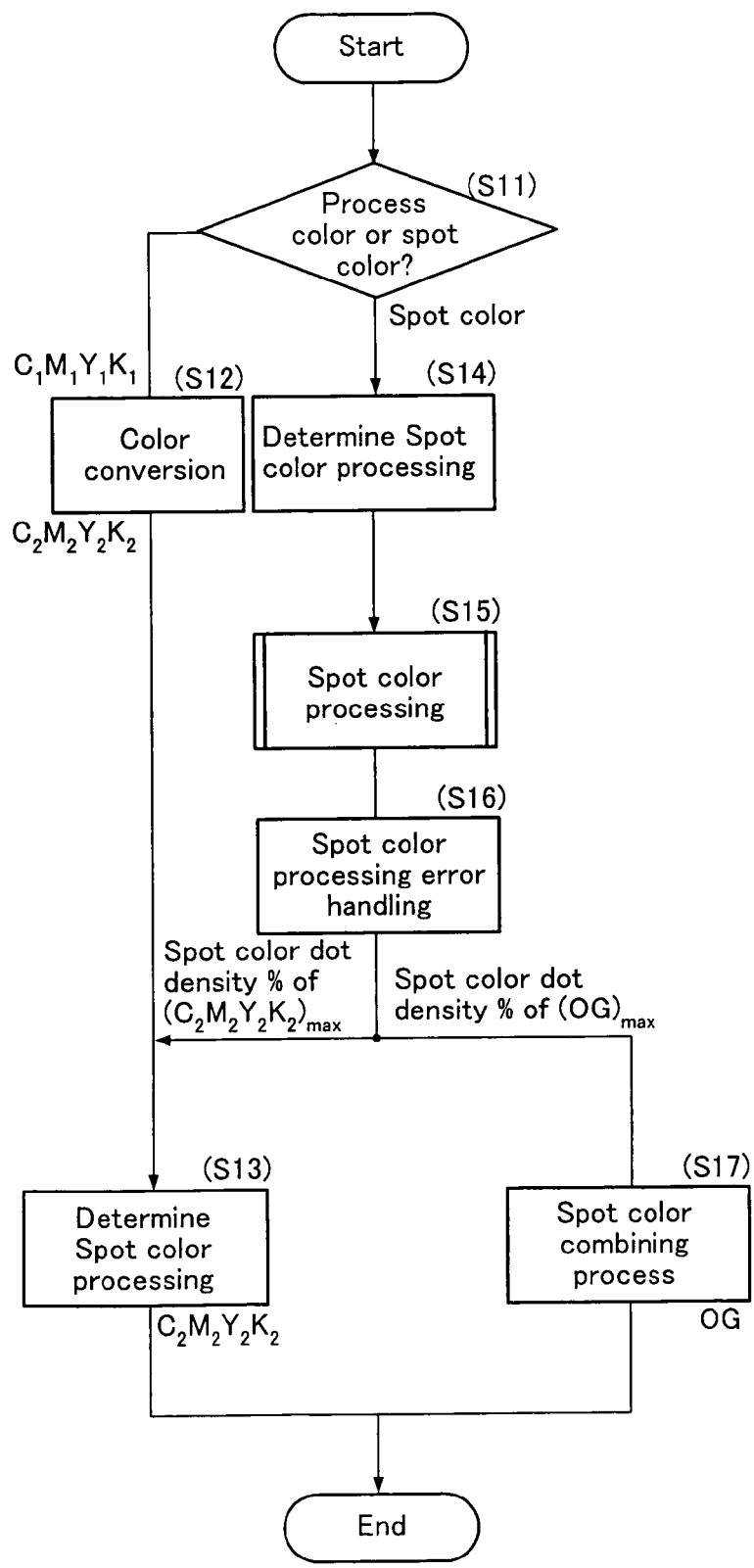
FIG. 13 is a conceptual flowchart of a color conversion program shown in FIG. 4.

FIG. 13 shows a conceptual flowchart of the color conversion program 200 shown in FIG. 4.

When printing image data including the process colors and spot colors, the data is separated into the group of the process colors ($C_1M_1Y_1K_1$) and the group of the spot colors (in this example, up to four spot colors SP1, SP2, SP3, and SP4) (step S11). The process colors ($C_1M_1Y_1K_1$) are converted into process colors for printer ($C_2M_2Y_2K_2$) at step S12.

The color conversion at step S12 corresponds to the process color processing section 210 of the color conversion program 200 in FIG. 4 and the process color processing section 310 of the color conversion apparatus 300 in FIG. 5. A process color combining processing (step S13) is performed on the process colors ($C_2M_2Y_2K_2$) converted for the printer at step S12 (step S13). The process color combining processing (step S13) will be described later.

For the spot colors (SP1, SP2, SP3, and SP4) separated from the process colors ($C_1M_1Y_1K_1$), spot color processing to be applied to them is determined (step S14) and the spot color processing is performed (step S15). Spot color data inputted into the spot color processing (step S15) includes the spot color names and the dot density % of each pixel of the colors having the spot color names. The step of determining spot color processing method at S14 corresponds to the spot color processing determining section 250 of the color conversion program 200 in FIG. 4 and the spot color processing determining section 350 of the color conversion apparatus in FIG. 5. The spot color processing step at S15 corresponds to the first to third spot color processing sections 220 to 240 of the color conversion program 200 in FIG. 4 and the first to third spot color processing sections 320 to 340 of the color conversion apparatus 300 in FIG. 5. The spot color processing at step S15 in FIG. 13 will be detailed later.

If an error occurs during the spot color processing (step S15), error handling concerning the spot color processing, such as indicating the error to the operator, is performed (step S16). If there is no error, the process proceeds to the process color combining processing (step S13) and a spot color combining processing (step S17). If the process proceeds to the process color combining processing (step S13) by way of the spot color processing at step S15, the dot density % of the spot color is already known, and the $C_2M_2Y_2K_2$ values equivalent to the full density of the spot color (the values are denoted herein as ($C_2M_2Y_2K_2$)$_{max}$) are obtained in the spot color processing at step S15. These values are combined with the $C_2M_2Y_2K_2$ values obtained in the color conversion of the process colors at step S12 (step S13) to generate data ($C_2M_2Y_2K_2$ values) on the process colors constituting printer image data to be sent to the printer 60 (see FIG. 1).

In the process color combining step (step S13), the $C_2M_2Y_2K_2$ values are first calculated from the dot density value and the ($C_2M_2Y_2K_2$)$_{max}$ of the spot color. For example, if a given pixel has a spot color dot density value of 60% and the $(C_2M_2Y_2K_2)_{max}$ of (40, 30, 20, 10), the $C_2M_2Y_2K_2$ values of the spot color will be $(C_2, M_2, Y_2, K_2) = (40 \times 0.6 \ 30 \times 0.6 \ 20 \times 0.6 \ 10 \times 0.6) = (24 \ 18 \ 12 \ 6)$.

In the process color combining step (step S13), the $C_2M_2Y_2K_2$ value thus obtained is then combined with the $C_2M_2Y_2K_2$ values obtained by performing the color conversion at step S12. For example, if $(C_2, M_2, Y_2, K_2) = (24 \ 18 \ 12 \ 6)$ are obtained as the $C_2M_2Y_2K_2$ values of the spot color of a given pixel as described above and the $C_2M_2Y_2K_2$ values obtained by applying the color conversion to the same pixel at step S12 are $(C_2, M_2, Y_2, K_2) = (20 \ 15 \ 10 \ 5)$, then the $C_2M_2Y_2K_2$ values obtained at both steps are added together and combined into $(C_2, M_2, Y_2, K_2) = (24+20, 18+15, 12+10, 6+5) = (44 \ 33 \ 22 \ 11)$. For simplicity, it is assumed here that one pixel has one spot color. If two or more spot colors are used, all of the spot colors are added together. While simple additions are given as an example of combining, more complex combining algorithms may be used.

In the spot color combining processing at step S17, spot color combining is applied to the density value of the spot color and the values of O (orange) and G (green) of the spot color value with the full density (this is denoted herein as $(OG)_{max}$) obtained in the spot color processing (step S15). Alternatively, if the processing is performed using the third simulation method (the third spot color processing section), the ink color name of O or G that corresponds to the spot color for printing is obtained instead of the $(OG)_{max}$. In that case, the ink color name obtained is equivalent to the maximum value of O or G (dot density=100%) obtained as $(OG)_{max}$. This is also denoted as $(OG)_{max}$, for convenience.

In step S17, combining processing is applied to the spot colors (in this example, O and G) for the printer and performed as follows.

For example, if the dot density of the spot color of a given pixel is 60% and the $(OG)_{max}$ value is (O, G)=(80, 0), the dot density of the spot color ink of that spot color for the printer can be obtained as $(O, G) = (80 \times 0.6 \ 0 \times 0.6) = (48, 0)$. This means that the dot density, 60%, of the spot color for printing is represented by the dot density, 48%, of the ink of orange (O), but green (G) is not used. Another example is given in which the third simulation method has been used to obtain the ink color name of O or G. If the ink color name is G (green) and the dot density of the spot color for printing is 60%, for example, this is equivalent to that the $(OG)_{max}$ value, (O, G)=(0, 100), has been obtained, as described previously. Accordingly, the dot density=60% (100%×0.6=60%) of the ink of G will be used.

In the examples described above, only one spot color for printing is used. If two or more spot colors for printing are used for a given pixel, the dot density values of O obtained for the spot colors are added together, the dot density values of G of the spot colors are also added together, and finally the printer tone data of O and G of that pixel is obtained.

The tone data of $C_2M_2Y_2K_2OG$ for printer obtained as describe above is inputted into the printer 60 (see FIG. 1), where a proof image is printed out according to that data.

Figure 14:
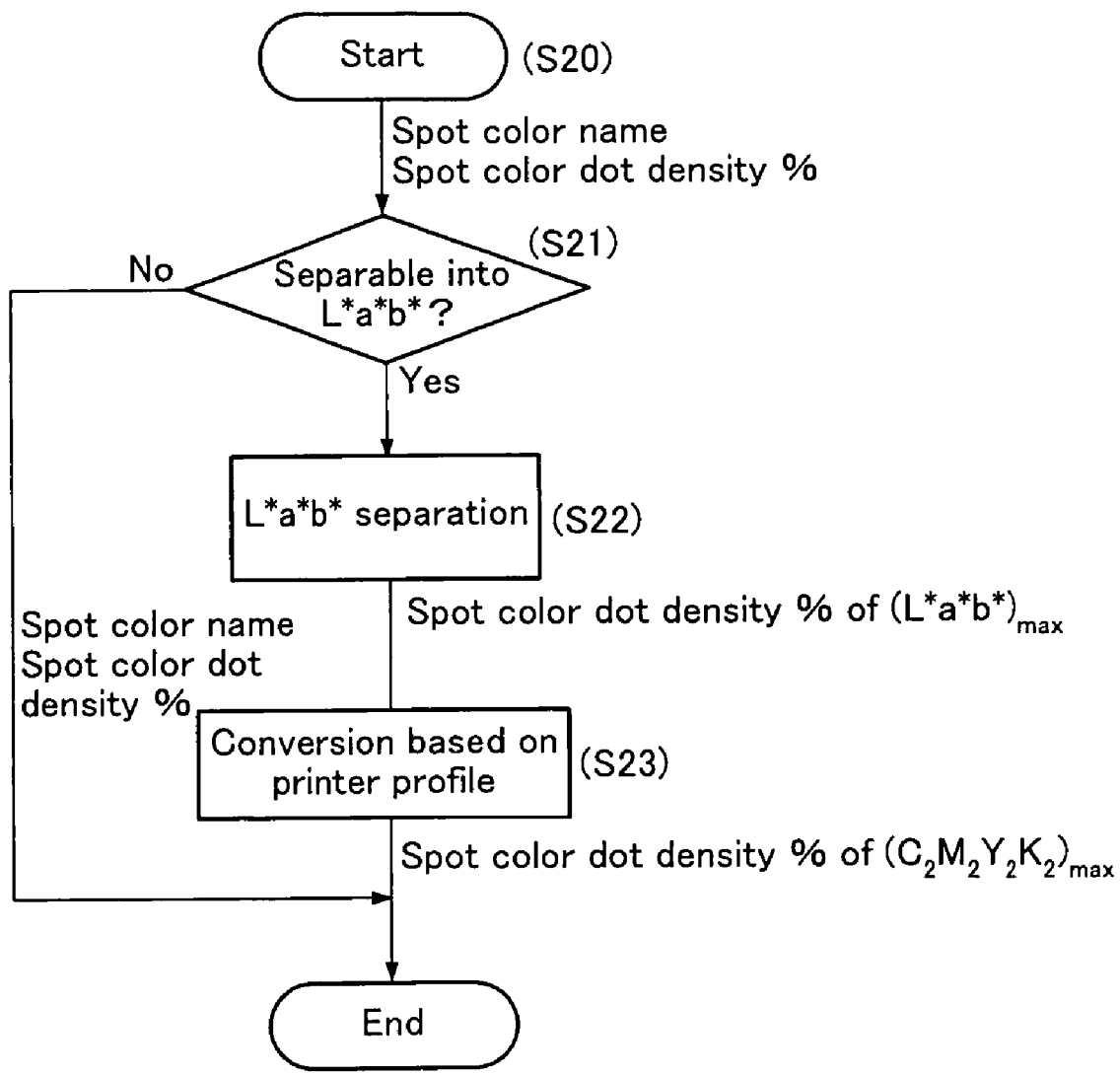
FIG. 14 is a diagram illustrating a first simulation method.

FIG. 14 shows a diagram illustrating the first simulation method.

The first simulation method in FIG. 14 represents the first spot color processing section 220 in FIG. 4 and the first spot color processing section 320 in FIG. 5.

The L*a*b* separation spot color table shown in FIG. 9 is referred to and determination is made as to whether the spot color with a printing spot color name can be separated into L*a*b*, that is, whether correspondence between the spot color name and L*a*b* values is defined in the L*a*b* separation spot color table shown in FIG. 9 (step S21). If the result is affirmative, L*a*b* separation is performed, in which the color with the spot color name is converted into L*a*b* values with reference to the L*a*b* separation spot color table (step S22). The L*a*b* values obtained here are $(L^*a^*b^*)_{max}$, namely the L*a*b* values of the maximum density of the spot color (solid). Then, $(L^*a^*b^*)_{max}$ obtained is converted into $(C_2M_2Y_2K_2)_{max}$ (step S23), namely the $C_2M_2Y_2K_2$ values of the maximum density (solid) of the spot color for the printer 60 (FIG. 1), with reference to the printer profile (FIG. 7). Data about the spot color dot density % is originally provided.

On the other hand, if it is determined at step S21 that the spot color cannot be separated into L*a*b* values, that is, the spot color name is not associated with L*a*b* values in the L*a*b* separation spot color table shown in FIG. 9, the method exits the routine without performing any operation.

The entire first simulation method shown in FIG. 14 is herein referred to as step S20.

Figure 15:
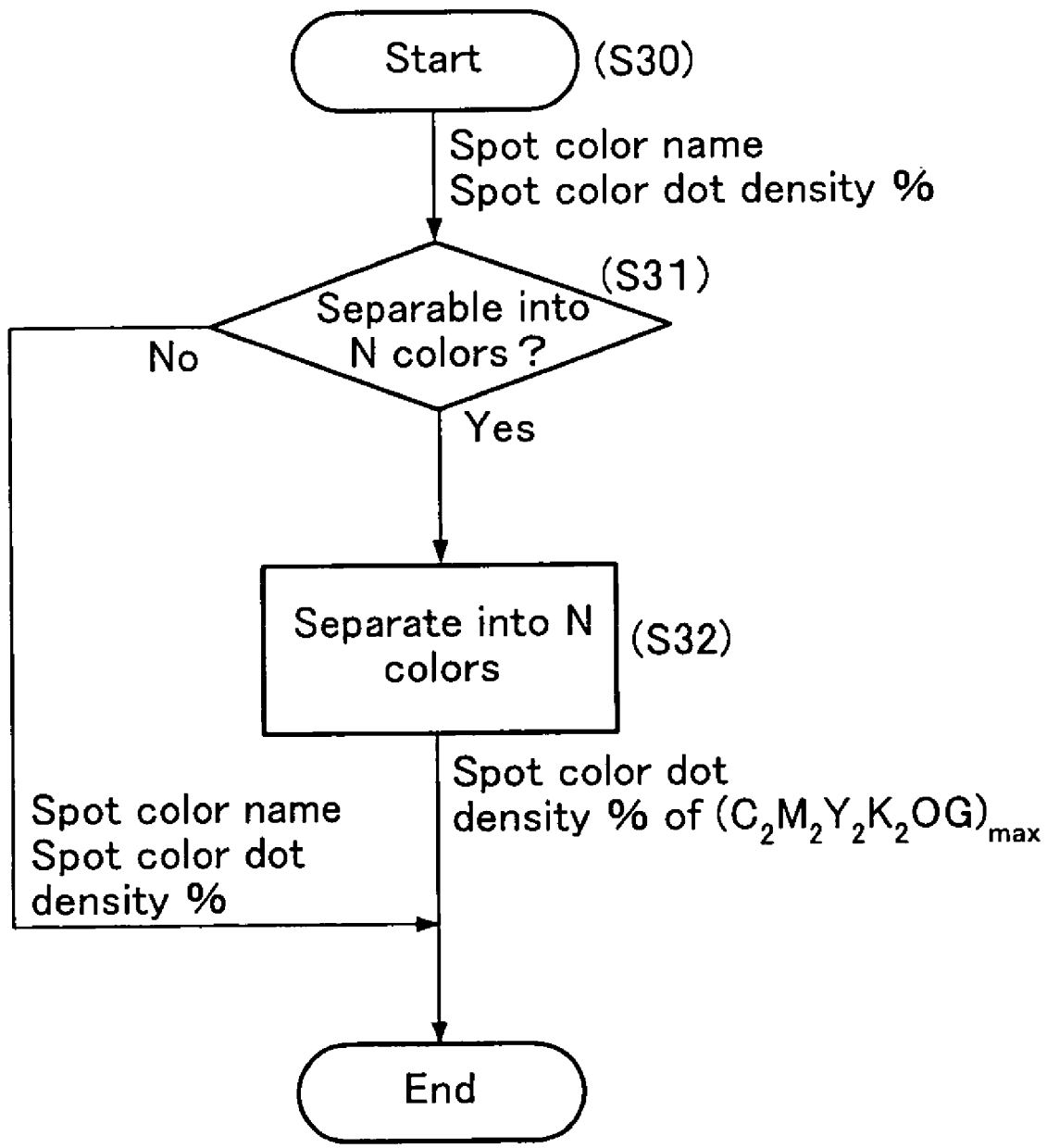
FIG. 15 is a diagram illustrating a second simulation method.

FIG. 15 illustrates the second simulation method.

The second simulation method in FIG. 15 represents the second spot color processing section 230 in FIG. 4 and the second spot color processing section 330 in FIG. 5.

Reference is made to the N-color separation table shown in FIG. 10 to determine whether the spot color can be separated into N colors (in this example, the six colors $C_2M_2Y_2K_2OG$), that is, whether correspondence between the spot color name and L*a*b* values is defined in the N-color separation table (step S31). If the result is affirmative, N-color separation is performed, in which the spot color with the spot color name is converted into $C_2M_2Y_2K_2OG$ values with reference to the N-color separation table (step S32).

The $C_2M_2Y_2K_2OG$ values obtained here are the $C_2M_2Y_2K_2OG$ values corresponding to $(C_2M_2Y_2K_2OG)_{max}$ that is the maximum density of the spot color (solid). Again, the spot color dot density % is originally provided.

If it is determined at step S31 that correspondence between the spot color name and $C_2M_2Y_2K_2OG$ values is not defined in the N-color separation table shown in FIG. 10, the method exits the routing without performing anything.

The entire second simulation method shown in FIG. 15 is herein referred to as step S30.

Figure 16:
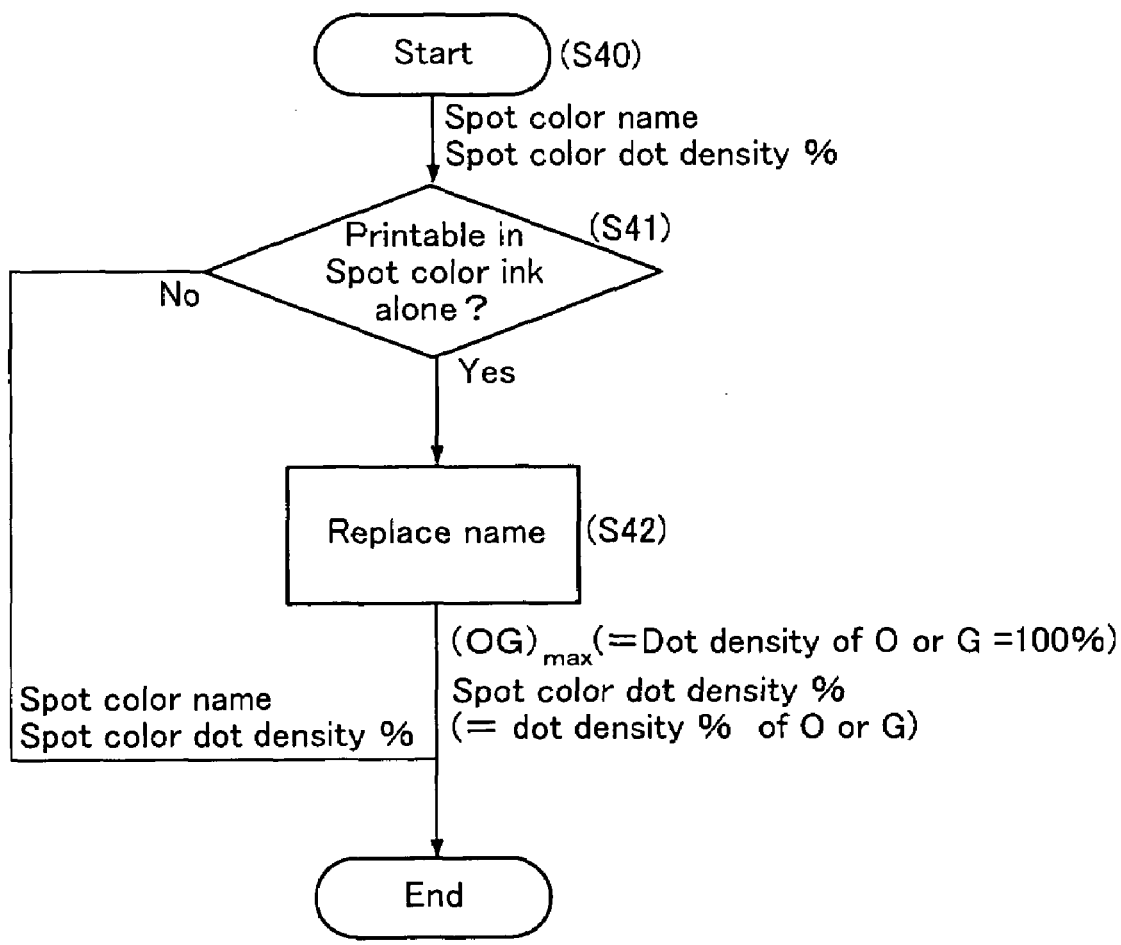
FIG. 16 is a diagram illustrating a third simulation method.

FIG. 16 illustrates the third simulation method.

The third simulation method in FIG. 16 represents the third spot color processing section 240 in FIG. 4 and the third spot color processing section 340 in FIG. 5.

Reference is made to the name replacing table shown in FIG. 11 to determine whether the spot color with the spot color name can be printed out in the spot color ink alone (in this example, orange (O) or green (G)), that is, correspondence between the spot color name and an ink name used on the printer is defined in the name replacing table in FIG. 11 (step S41). If it can be printed out in the spot color ink alone, separation code replacement is performed, in which the spot color name for printing is replaced with the ink color name of a spot color ink (in this example, O or G) with reference to the name replacing table in FIG. 11.

A printing spot color dot density % value provided originally is directly used as the dot density % of the spot color ink with the replaced ink name (O or G). If the value is denoted like $(C_2M_2Y_2K_2)_{max}$ and $(C_2M_2Y_2K_2OG)_{max}$ obtained by the first and second simulation methods in FIGS. 14 and 15, this is equivalent to that the 100% dot density value of O or G is obtained as $(OG)_{max}$ and the 100% dot density value is multiplied by the originally provided printing spot color dot density % to obtain the dot density % of the spot color ink (O or G) of the printer. Therefore, the value is denoted as $(OG)_{max}$ for consistency of notation.

For spot colors for which correspondence is not defined in the name replacing table shown in FIG. 11, the method exits this routine without performing anything.

Herein, the entire third simulation method shown in FIG. 16 is referred to as step S40.

In the spot color processing at step S15 in FIG. 13, a combination of the first, second and third simulation methods shown in FIGS. 14 to 16 which is determined at step S14 (in FIG. 13) is executed according to the simulation method determining table illustrated in FIG. 12.

The combinations of the first, second, and third simulation methods according to the simulation method determining table will be described below. Each of the combinations (FIGS. 17, 19, 21, and 23) is equivalent to spot color processing to be executed according to the simulation method determining table (step S15 in FIG. 13).

Figure 17:
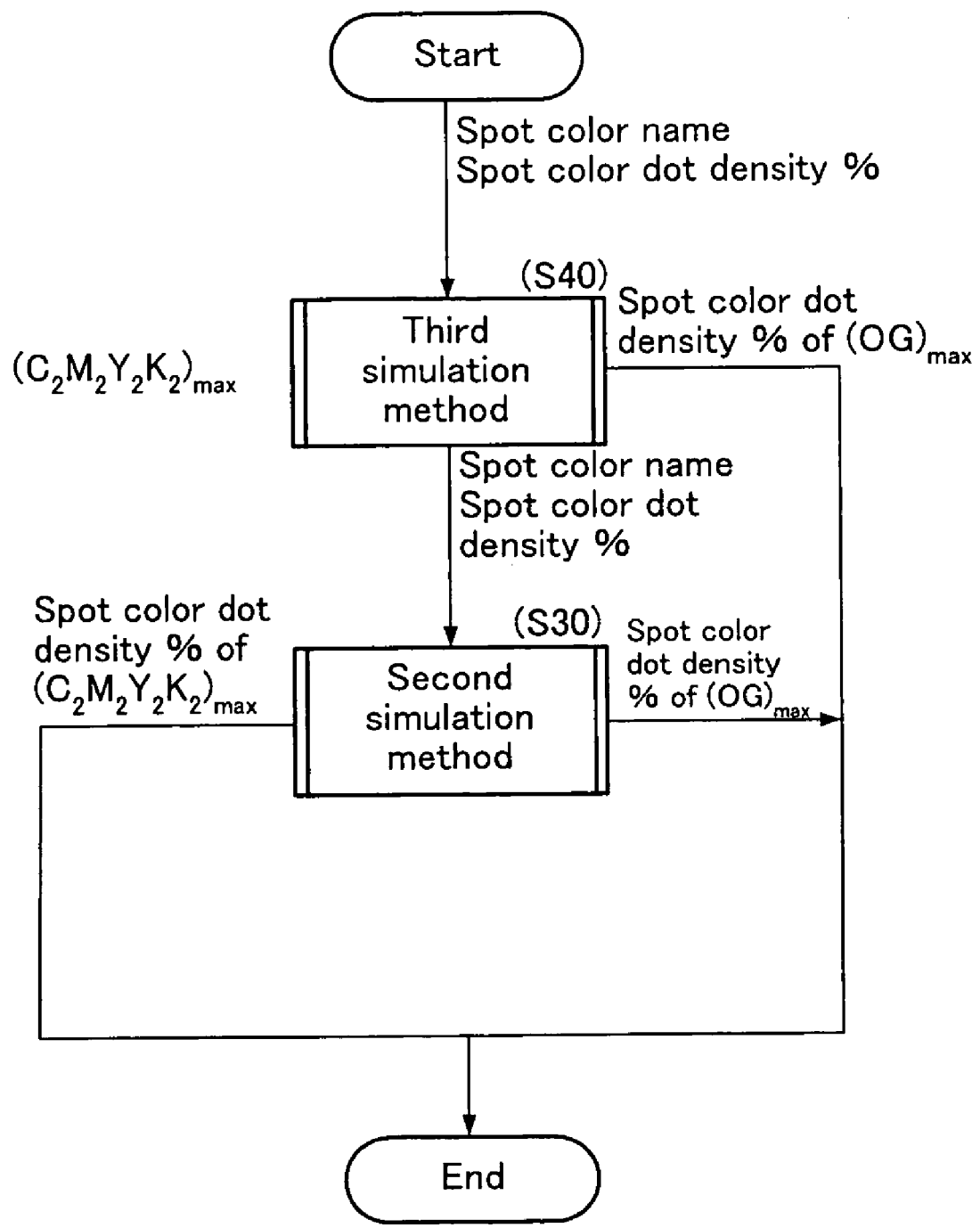
FIG. 17 is a flowchart for a combination according to the simulation method determining table shown in FIG. 12.

FIG. 17 is a flowchart illustrating a combination according to the simulation method determining table shown in FIG. 12.

Because "OFF" is specified for the first simulation method in the simulation method determining table in FIG. 12, the first simulation method is not used. Also, because "ON" is specified for the second and third simulation methods, both of them are used. Because higher priority is specified for the third simulation method, the third simulation method is given higher priority in use.

In FIG. 17, the third simulation method (see FIG. 16) is executed first. For a spot color for which correspondence is defined in the name replacing table in FIG. 11, the spot color name is replaced with an ink color name (in this example, O or G) used on the printer (step S40). $(OG)_{max}$ indicated at step S40 in FIG. 17 represents the dot density of O or G 100%, as describe previously.

For a spot color for which correspondence is not defined in the separation code table and therefore cannot be converted by the third simulation method in step S40, the second simulation method (see FIG. 15) is executed. Here, the spot color name of the spot color is converted to $(C_2M_2Y_2K_2OG)_{max}$ with reference to the N-color separation table shown in FIG. 10 (step S30).

If there is still a spot color that can be converted by neither the third simulation method (step S40) nor the second simulation method (step S30), error handling (step S16 in FIG. 13) is performed.

While $(C_2M_2Y_2K_2)_{max}$ and $(OG)_{max}$ are indicated separately at step S30 in FIG. 17 for the sake of indicating the values for the process colors and the spot colors separately, they are equivalent to the expression $(C_2M_2Y_2K_2OG)_{max}$, which is the combination of these.

FIG. 18 shows another exemplary simulation method determining table.

In the simulation determining table shown in FIG. 18, "ON" is specified for the first and third simulation methods and "OFF" is specified for the for the second simulation method. Accordingly, the first and third simulation methods are used but the second simulation method is not used here. In addition, because the priority "2" is specified for the first simulation method and "1" is specified for the third simulation method, the third simulation method is given priority in use.

Figure 19:
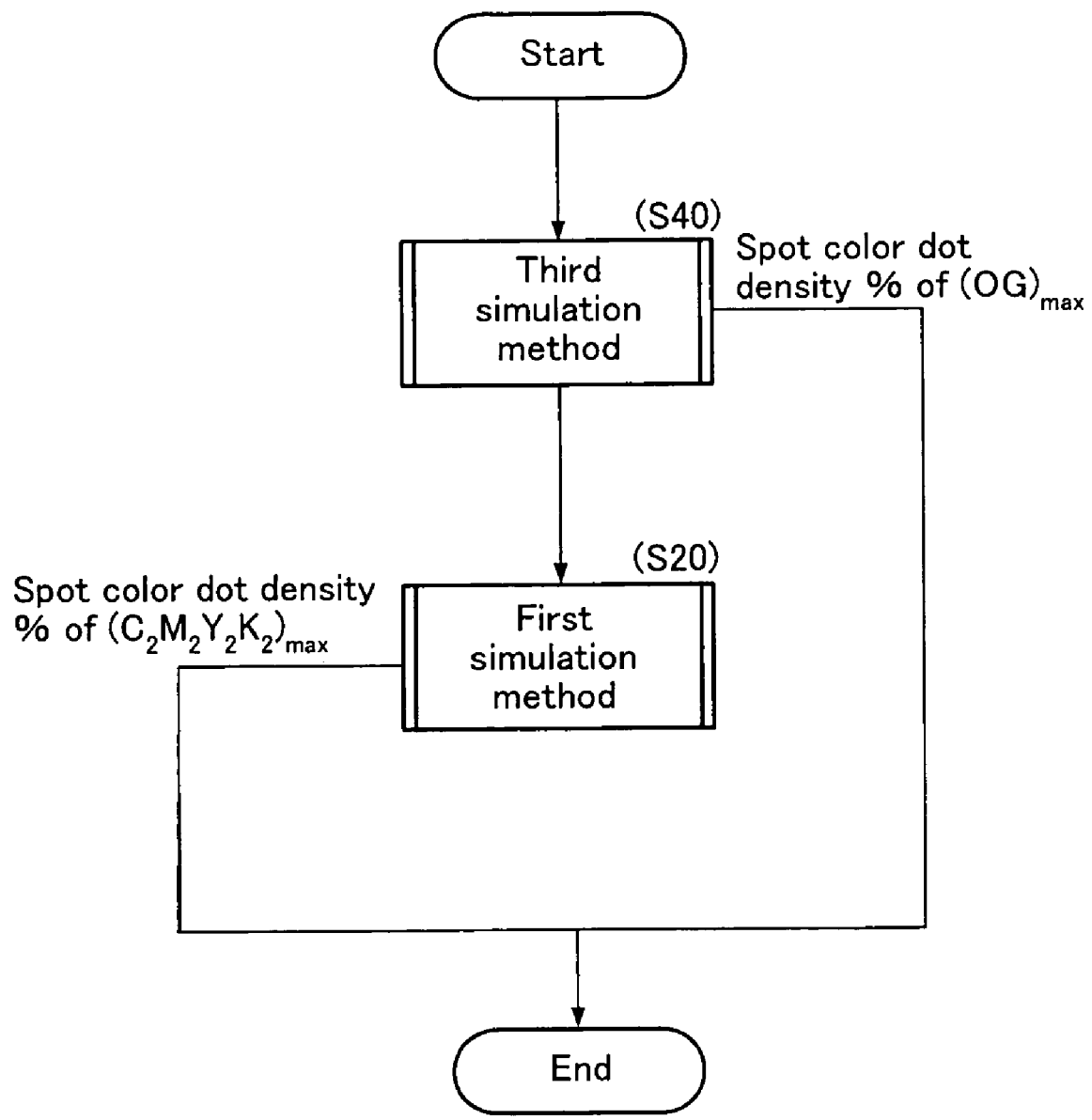
FIG. 19 is a flowchart illustrating a combination according to the simulation method determining table shown in FIG. 18.

FIG. 19 is a flowchart showing a combination according to the simulation method determining method shown in FIG. 18.

The third simulation method is executed first (step S40; see FIG. 16), then the first simulation method is executed (step S20).

The third simulation method (step S40) is the same as the third simulation method shown in FIG. 17 and therefore the description of which is omitted here.

In the first simulation method (step S20) in FIG. 19, the process shown in FIG. 14 is performed. In particular, the L*a*b* separation spot color table in FIG. 9 is referred to and $(L*a*b*)_{max}$ of a spot color that is not converted by the third simulation method (step S40) is obtained from to the L*a*b* separation spot color table. Then, $(C_2M_2Y_2K_2)_{max}$ is obtained by referring to the printer profile shown in FIG. 7.

If there is a spot color that can be converted by neither the third simulation method (step S40) nor the first simulation method (step S20), error handling (step S16 in FIG. 13) is performed.

FIG. 20 shows another exemplary simulation method determining table.

In the simulation method determining table shown in FIG. 20, "ON" is specified for the first and second simulation methods and "OFF" is specified for the third simulation method. Accordingly, the first and second simulation methods are used but the third simulation method is not used here. In addition, because priority "2" is specified for the first simulation method and "1" is specified for the second simulation method, the second simulation method is given priority in use.

Figure 21:
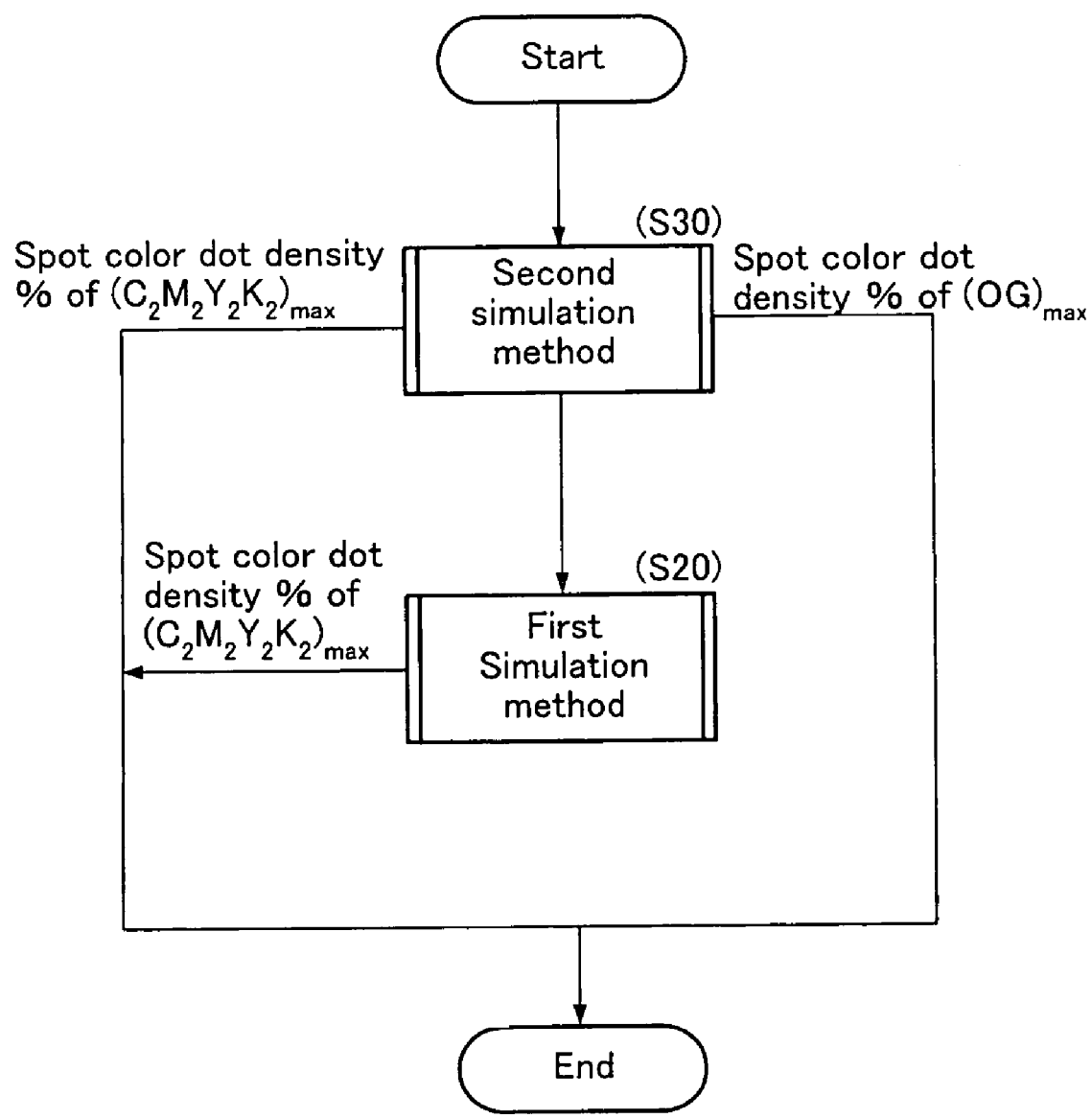
FIG. 21 is a flowchart illustrating a combination according to the simulation determining table shown in FIG. 20.

FIG. 21 is a flowchart showing a combination according to the simulation method determining table shown in FIG. 20.

Here, the second simulation method is executed first (step S30; see FIG. 15), then the first simulation method is executed (step S20).

The second simulation method (step S30) is the same as the second simulation method shown in FIG. 17 and the first simulation method (step S20) is the same as the first simulation method shown in FIG. 19, therefore the description of which is omitted here.

If there is a spot color that can be converted by neither the second simulation method (step S30) nor the first simulation method (step S20), error handling (step S16 in FIG. 13) is performed.

FIG. 22 shows yet another exemplary simulation method determining table.

Figure 23:
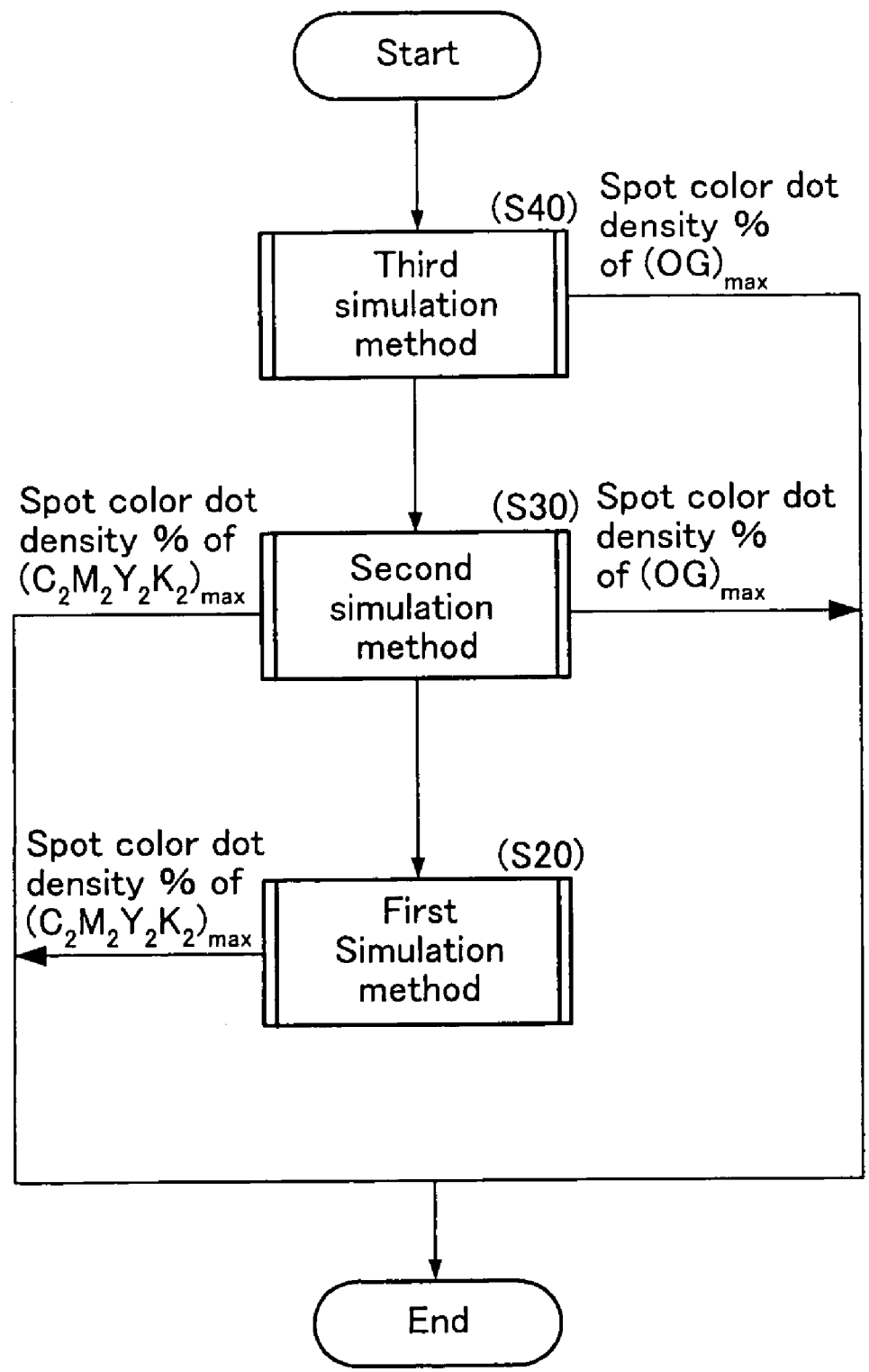
FIG. 23 is a flowchart illustrating a combination according to the simulation table shown in FIG. 22.

FIG. 23 is a flowchart showing a combination according to the simulation method determining table shown in FIG. 22.

In the simulation method determining table shown in FIG. 22, "ON" is specified for all of the first to third simulation methods. That is, all of the first to third simulation methods are defined as being used. In addition, priority "3" is specified for the first simulation method, "2" is specified for the second simulation method, and "1" is specified for the third simulation method. Accordingly, as shown in FIG. 23, the third simulation method (step S40) is executed first. Then, the second simulation method (step S30) is executed for a spot color that has not been converted by the third simulation method. For a spot color that has not been converted by the second simulation method, the first simulation method (step S20) is executed. If there is still a spot color that has not been converted, error handling is performed at step S16 in FIG. 13.

Figure 24:
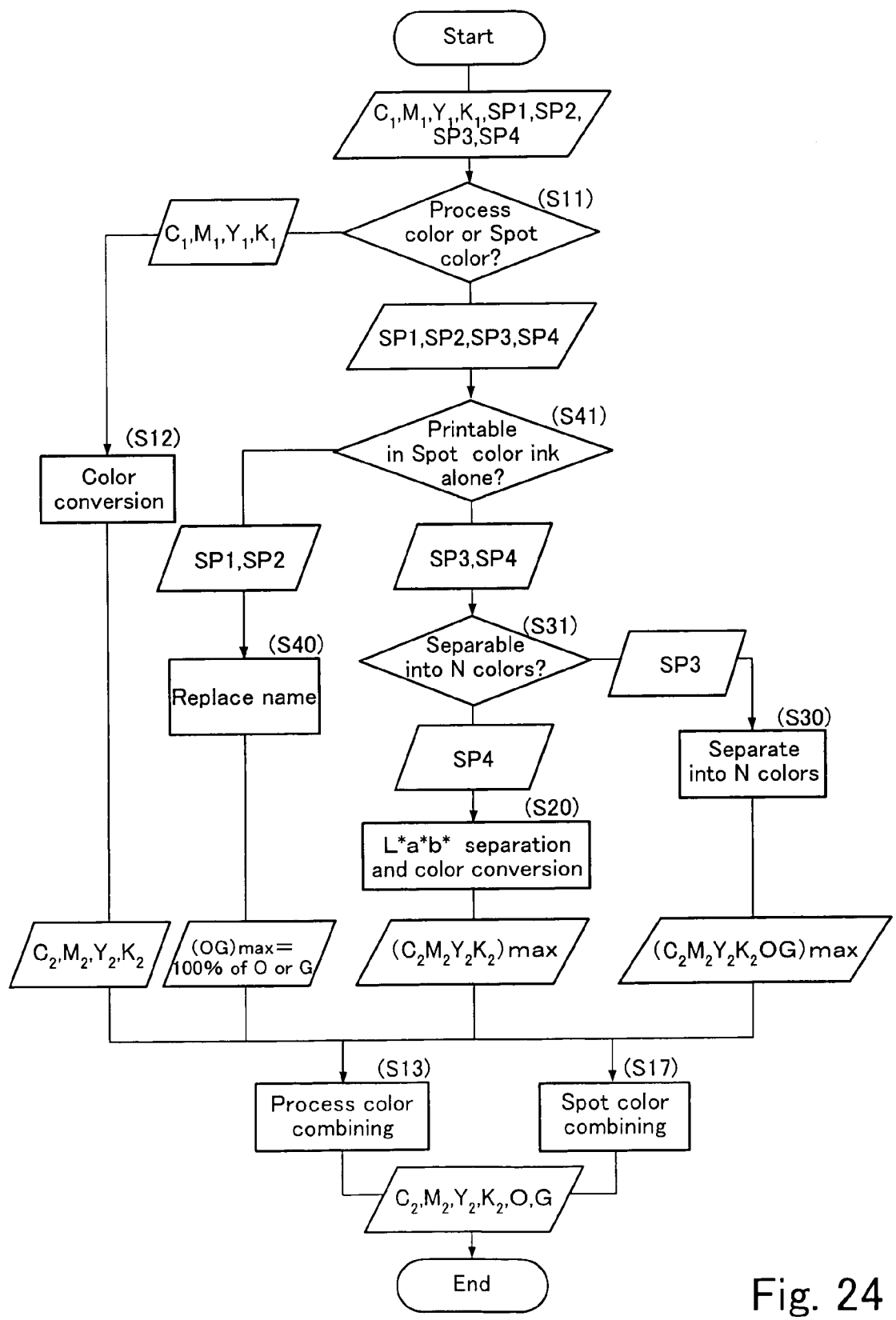
FIG. 24 is a flowchart elaborating the conceptual flowchart shown in FIG. 23 based on the simulation method determining table shown in FIG. 22.

FIG. 24 is a flowchart elaborating the conceptual flowchart shown in FIG. 23 based on the simulation method determining table shown in FIG. 22.

Referring to FIG. 24, the flow of spot color processing (step S15 in FIG. 13) according to the simulation method determining table shown in FIG. 22 will be described again.

Printing image data including printing process colors $C_1M_1Y_1K_1$ and spot colors SP1, SP2, SP3, and SP4 is inputted and the data is first separated into the group of process colors ($C_1M_1Y_1K_1$) and the group of spot colors (SP1, SP2, SP3, SP4) (step S11, which corresponds to step S11 in FIG. 13).

The process colors ($C_1M_1Y_1K_1$) are converted with reference to the link file (see FIG. 8) into printer process color ($C_2M_2Y_2K_2$) data (step S12, which corresponds to step S12 in FIG. 13). The process colors ($C_2M_2Y_2K_2$) are combined with process colors (step S13), which are converted from a spot color for printing as described below.

For each of the spot colors (SP1, SP2, SP3, SP4) separated from the process colors ($C_1M_1Y_1K_1$) at step S11, determination is made with reference to the name replacing table (FIG. 11) as to whether the spot color for printing can be printed out by using a spot color ink alone.

According to the name replacing table in FIG. 11, spot colors SP1 and SP2 for printing can be replaced with orange (O) and green (G), respectively. For those spot colors, replacement (SP1→O and SP2→G) is performed accordingly (step S40).

For spot colors (SP3 and SP4) that are found to be not printable in spot color inks alone at step S41, determination is made with reference to the N-color separation table (FIG. 10) as to whether they can be separated into N colors (step S31).

According to the N-color separation table in FIG. 10, SP3 is separable into N colors but SP4 is not separable into N colors. It should be noted that while SP1 is also separable into N colors according to the N-color separation table in FIG. 10, SP1 is excluded from the determination at step S31 because SP1 has been found to be printable in an spot color ink alone at step S41. SP3 is found to be separable at step S31 and therefore is separated into N colors (step S30). SP3 is converted into ($C_2M_2Y_2K_2OG$)=(50 20 0 0 0 30) according to the N-color separation table.

For SP4, L*a*b* separation with reference to the L*a*b* separation spot color table in FIG. 9 and color conversion with reference to the printer profile in FIG. 7 are performed (step S20) because SP4 has been found to be inseparable into N colors at step S31.

At step S13, the process colors obtained as described above are collected and combined as described previously. At step S17, printer spot color inks (O and G) obtained as described above are combined together. The combination of step S13 and step S17 corresponds to the color combining section 260 in FIG. 4 and the color combining section 360 in FIG. 5.

The final printer image data consisting of $C_2M_2Y_2K_2OG$ obtained in this way is sent to the printer 60 (FIG. 1), where an image 61 (see FIG. 1) based on the printer image data is printed out.

While a simulation method determining table is used to define both whether each of the first simulation method (first spot color processing section), the second simulation method (second spot color processing section), and the third simulation method (third spot color processing section) is to be used, and the priorities in used if more then one methods are used. The priorities may be predetermined in a fixed manner as in the simulation method determining table shown in FIG. 22, for example, and only whether each of the simulation methods (spot color processing sections) is to be used may be defined.

While a printer that outputs an image based on CMYK and spot colors has been described by way of example, the present invention can also be applied to printers that outputs an image based on RGB data.

What is claimed is:

1. A color conversion apparatus which converts image data for printing which includes process color tone data for printing and spot color tone data for printing into image data for printer which includes tone data for a printer, the color conversion apparatus comprising:

a process color processing section which has a link profile in which process colors for printing are associated with colors for the printer and converts process color tone data in the image data for printing into the tone data for the printer according to the link profile;

a first spot color processing section which has a first spot color name conversion table in which the spot color names of spot colors for printing are associated with the coordinates in a given common color space that correspond to the maximum densities of the spot colors and a printer profile in which the common color space is associated with colors for the printer, and first converts the spot color name of a spot color in the image data for printing into coordinates in the common color space with reference to the first spot color name conversion table and then converts the coordinates in the common color space obtained from the conversion into tone data for the printer that corresponds to the maximum density of the spot color with reference to the printer profile;

a second spot color processing section which has a second spot color name conversion table in which the spot color names of spot colors for printing are associated with colors for the printer that correspond to the maximum densities of the spot colors, and directly converts the spot color name of a spot color in the image data for printing into tone data, excluding a step of converting into a common color space, for the printer that corresponds to the maximum density of the spot color with reference to the second spot color name conversion table;

a spot color processing determining section which determines whether each of the first and second spot color processing sections should be applied or not; and a color combining section which combines tone data for the printer obtained by the process color processing section with the tone data of a spot color in the image data for printing, in accordance with the tone data for the printer that corresponds to the maximum density of a spot color for printing obtained by the first spot color conversion section when the first spot color conversion section is applied and tone data for the printer that corresponds to the maximum density of a spot color for printing obtained by the second spot color conversion section when the second spot color conversion section is applied, and thereby generates the image data for the printer.

2. The color conversion apparatus according to claim 1, wherein the spot color processing determining section determines whether each of the first and second spot color processing sections should be applied or not, and determines the priorities in application of the first and second spot color processing sections if both of the first and second spot color processing sections are applied.

3. The color conversion apparatus according to claim 2, wherein the first and second spot color processing sections are used according to the priorities, determined by the spot color processing determining section, in application of the first and second spot color processing sections.

4. The color conversion apparatus according to claim 1, further comprising a third spot color processing section which has a third spot color name conversion table in which the spot color names of spot colors for printing are associated with specific color names for the printer, and converts the spot color name of a spot color in the image data for printing into a specific color name for the printer that corresponds to the spot color name with reference to the third spot color name conversion table, wherein the spot color processing determining section determines whether each of the first and second spot color processing sections should be applied or not and also determines whether the third spot color processing section should be applied or not, and wherein the color combining section combines tone data for the printer obtained by the process color processing section and tone data of a spot color in the image data for printing, in accordance with a specific color name for the printer that corresponds to a spot color name for printing obtained by the third spot color conversion section when the third spot color conversion section is applied, in addition to tone data for the printer that corresponds to the maximum density of the spot color for printing obtained by the first spot color conversion section when the first spot color conversion section is applied and tone data for the printer that corresponds to the maximum density of a spot color for printing obtained by the second spot color conversion section when the second color conversion section is applied, and thereby generates the image data for the printer.

5. The color conversion apparatus according to claim 4, wherein the spot color processing determining section determines whether each of the first, second, and third spot color processing sections should be applied or not and, if two or more of the first, second, and third spot color processing sections are applied, determines the priorities in application of the two or more spot color processing sections.

6. The color conversion apparatus according to claim 1, wherein the second spot color name conversion table determines whether the second spot color can be separated into N colors.

7. The color conversion apparatus according to claim 6, wherein the N colors comprise $C_2M_2Y_2K_2$.

8. The color conversion apparatus according to claim 7, wherein the N colors additionally comprise spot colors.

9. The color conversion apparatus according to claim 8, wherein the spot colors are O (orange) and G (green).

10. The color conversion apparatus according to claim 1, wherein the process color processing section converts $C_1M_1Y_1K_1$ to $C_2M_2Y_2K_2$.

11. The color conversion apparatus according to claim 1, further comprising means for determining whether each spot color is printable or not printable in spot color inks.

12. The color conversion apparatus according to claim 11, wherein when it is determined the spot colors are printable in spot color inks, said second spot color processing section processes said spot color and when it is determined the spot colors are not printable in spot color inks, said first spot color processing section performs color separation.

13. The color conversion apparatus according to claim 12, wherein the separation colors process colors and spot colors.

14. The color conversion apparatus according to claim 12, wherein the separation colors are process colors.

15. A color conversion program computer-readable storage medium on which a color conversion program is stored, the color conversion program being executed within an information processing device on which a program is executed and causing the information processing device to function as a color conversion apparatus which converts image data for printing which includes process color tone data for printing and spot color tone data for printing into image data for printer which includes tone data for a printer, in which the color conversion program stored on the color conversion program computer-readable storage medium causes the information processing device to function as a color processing device comprising:

a process color processing section which has a link profile in which process colors for printing are associated with colors for the printer and converts process color tone data in the image data for printing into the tone data for the printer according to the link profile;

a first spot color processing section which has a first spot color name conversion table in which the spot color names of spot colors for printing are associated with the coordinates in a given common color space that correspond to the maximum densities of the spot colors and a printer profile in which the common color space is associated with colors for the printer, and first converts the spot color name of a spot color in the image data for printing into coordinates in the common color space with reference to the first spot color name conversion table and then converts the coordinates in the common color space obtained from the conversion into tone data for the printer that corresponds to the maximum density of the spot color with reference to the printer profile;

a second spot color processing section which has a second spot color name conversion table in which the spot color names of spot colors for printing are associated with colors for the printer that correspond to the maximum densities of the spot colors, and directly converts the spot color name of a spot color in the image data for printing into tone data, excluding a step of converting into a common color space, for the printer that corresponds to the maximum density of the spot color with reference to the second spot color name conversion table;

a spot color processing determining section which determines whether each of the first and second spot color processing sections should be applied or not; and a color combining section which combines tone data for the printer obtained by the process color processing section with the tone data of a spot color in the image data for printing, in accordance with tone data for the printer that corresponds to the maximum density of a spot color for printing obtained by the first spot color conversion section when the first spot color conversion section is applied and tone data for the printer that corresponds to the maximum density of a spot color for printing obtained by the second spot color conversion section when the second spot color conversion section is applied, and thereby generates the image data for the printer.

16. The color conversion program computer-readable storage medium according to claim 15, wherein the spot color processing determining section determines whether each of the first and second spot color processing sections should be applied or not, and determines the priorities in application of the first and second spot color processing sections if both of the first and second spot color processing sections are applied.

17. The color conversion program computer-readable storage medium according to claim 16, wherein the first and second spot color processing sections are used according to the priorities, determined by the spot color processing determining section, in application of the first and second spot color processing sections.

18. The color conversion program computer-readable storage medium according to claim 15, wherein the color conversion program stored thereon causes the information processing device to function as the color conversion apparatus further comprising a third spot color processing section, and the third spot color processing section has a third spot color name conversion table in which the spot color names of spot colors for printing are associated with specific color names for the printer and converts the spot color name of a spot color in the image data for printing into a specific color name for the printer that corresponds to the spot color name with reference to the third spot color name conversion table, wherein the spot color processing determining section determines whether each of the first and second spot color processing sections should be applied or not and also determines whether the third spot color processing section should be applied or not, and wherein the color combining section combines tone data for the printer obtained by the process color processing section and tone data of a spot color in the image data for printing, in accordance with a specific color name for the printer that corresponds to a spot color name for printing obtained by the third spot color conversion section when the third spot color conversion section is applied, in addition to tone data for the printer that corresponds to the maximum density of the spot color for printing obtained by the first spot color conversion section when the first spot color conversion section is applied and tone data for the printer that corresponds to the maximum density of a spot color for printing obtained by the second spot color conversion section when the second color conversion section is applied and thereby generates the image data for the printer.

19. The color conversion program computer-readable storage medium according to claim 18, wherein the spot color processing determining section determines whether each of the first, second, and third spot color processing sections should be applied or not and, if two or more of the first, second, and third spot color processing sections are applied, determines the priorities in application of the two or more spot color processing sections.

20. The color conversion program computer-readable storage medium according to claim 15, wherein the second spot color name conversion table determines whether the second spot color can be separated into N colors.

21. The color conversion program computer-readable storage medium according to claim 20, wherein the N colors comprise $C_2M_2Y_2K_2$.

22. The color conversion program computer-readable storage medium according to claim 21, wherein the N colors additionally comprise spot colors.

23. The color conversion program computer-readable storage medium according to claim 22, wherein the spot colors are O (orange) and G (green).

24. The color conversion program computer-readable storage medium according to claim 15, wherein the process color processing section converts $C_1M_1Y_1K_1$ to $C_2M_2Y_2K_2$.

25. The color conversion program computer-readable storage medium according to claim 15, further comprising means for determining whether each spot color is printable or not printable in spot color inks.

26. The color conversion program computer-readable storage medium according to claim 25, wherein when it is determined the spot colors are printable in spot color inks, said second spot color processing section processes said spot color and when it is determined the spot colors are not printable in spot color inks, said first spot color processing section performs color separation.

27. The color conversion program computer-readable storage medium according to claim 26, wherein the separation colors process colors and spot colors.

28. The color conversion program computer-readable storage medium according to claim 26, wherein the separation colors are process colors.

\* \* \* \* \*